United States Patent
Wakabayashi et al.

(10) Patent No.: US 9,711,934 B2
(45) Date of Patent: Jul. 18, 2017

(54) LASER APPARATUS

(71) Applicant: GIGAPHOTON INC., Tochigi (JP)

(72) Inventors: Osamu Wakabayashi, Tochigi (JP);
Takashi Matsunaga, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/145,251

(22) Filed: May 3, 2016

(65) Prior Publication Data
US 2016/0248219 A1    Aug. 25, 2016

Related U.S. Application Data

(63) Continuation of application No. PCT/JP2013/083658, filed on Dec. 16, 2013.

(51) Int. Cl.
| | |
|---|---|
| *H01S 3/13* | (2006.01) |
| *H01S 3/139* | (2006.01) |
| *H01S 3/225* | (2006.01) |
| *H01S 3/23* | (2006.01) |
| H01S 3/08 | (2006.01) |
| H01S 3/10 | (2006.01) |

(Continued)

(52) U.S. Cl.
CPC ............ *H01S 3/1305* (2013.01); *H01S 3/139* (2013.01); *H01S 3/225* (2013.01); *H01S 3/2308* (2013.01); *H01S 3/2375* (2013.01); *H01S 3/005* (2013.01); *H01S 3/0071* (2013.01); *H01S 3/0092* (2013.01); *H01S 3/08009* (2013.01); *H01S 3/10092* (2013.01); *H01S 3/1625* (2013.01)

(58) Field of Classification Search
CPC .... H01S 3/1305; H01S 3/2375; H01S 3/2308;
H01S 3/139; H01S 3/225; H01S 3/1625;
H01S 3/08009; H01S 3/005; H01S 3/10092; H01S 3/0071

See application file for complete search history.

(56) References Cited

U.S. PATENT DOCUMENTS

| | | | |
|---|---|---|---|
| 6,693,939 B2 | 2/2004 | Klene et al. | |
| 2007/0091968 A1 | 4/2007 | Wakabayashi et al. | |

(Continued)

FOREIGN PATENT DOCUMENTS

| | | |
|---|---|---|
| JP | 2006-186046 A | 7/2006 |
| JP | 2008-277617 A | 11/2008 |
| JP | 2008-277618 A | 11/2008 |

(Continued)

OTHER PUBLICATIONS

International Search Report of PCT/JP2013/083658 mailed Sep. 16, 2014.

*Primary Examiner* — Dung Nguyen
(74) *Attorney, Agent, or Firm* — Studebaker & Brackett PC

(57) ABSTRACT

A laser apparatus may include a first laser resonator configured to generate a laser beam, a first optical element configured to adjust a divergence in a first direction of the laser beam, a second optical element configured to adjust a divergence in a second direction of the laser beam, a measuring unit configured to measure the divergence in the first direction and the divergence in the second direction of the laser beam, and a controller configured to control one or both of the first optical element and the second optical element based on the divergence in the first direction and the divergence in the second direction of the laser beam both measured by the measuring unit.

20 Claims, 21 Drawing Sheets

(51) Int. Cl.
*H01S 3/00* (2006.01)
*H01S 3/16* (2006.01)

(56) References Cited

U.S. PATENT DOCUMENTS

2010/0197116 A1* 8/2010 Shah ................ B23K 26/38
 438/463
2013/0135601 A1* 5/2013 Okazaki ............ G03F 7/70408
 355/67

FOREIGN PATENT DOCUMENTS

| | | |
|---|---|---|
| JP | 4290001 B2 | 7/2009 |
| JP | 4818871 B2 | 11/2011 |
| JP | 5178047 B2 | 4/2013 |
| WO | 2004/095661 A1 | 11/2004 |

* cited by examiner

LASER APPARATUS

CROSS REFERENCE TO RELATED APPLICATIONS

This is a continuation of International Application No. PCT/JP2013/083658, filed Dec. 16, 2013, the entire contents of which are incorporated herein by reference.

BACKGROUND

The disclosure relates to a laser apparatus.

With miniaturization and high integration of a semiconductor integrated circuit, an improvement in resolution has been demanded in recent years for a semiconductor exposure apparatus. Hereinafter, the semiconductor exposure apparatus is simply referred to as an "exposure apparatus". Shortening in a wavelength of light to be outputted from an exposure light source has been in progress accordingly. In general, a gas laser apparatus is used in place of an existing mercury lamp for the exposure light source. For example, a KrF excimer laser apparatus and an ArF excimer laser apparatus each may be used as a gas laser apparatus directed to exposure. The KrF excimer laser apparatus may output ultraviolet laser light of a wavelength of 248 nm, and an ArF excimer laser apparatus may output ultraviolet laser light of a wavelength of 193 nm. For example, reference is made to Japanese Patent No. 4290001, U.S. Pat. No. 6,693,939, Japanese Patent No. 4818871, Japanese Patent No. 5096035, Japanese Patent No. 5111930, and Japanese Patent No. 5178047.

As a next generation exposure technology, liquid immersion exposure has been brought into practical use in which a clearance between an exposure lens on exposure apparatus side and a wafer is filled with a liquid. The liquid immersion exposure allows for a change in a refractive index between the exposure lens and the wafer, making it possible to shorten an apparent wavelength of light derived from the exposure light source. When the liquid immersion exposure is performed using the ArF excimer laser apparatus as the exposure light source, ultraviolet rays with a wavelength of 134 nm in water may be applied to the wafer. This technology is referred to as ArF liquid immersion exposure. The ArF liquid immersion exposure may also be referred to as an ArF liquid immersion lithography.

On the other hand, a spectral line width in free oscillation of each of the KrF excimer laser apparatus and the ArF excimer laser apparatus is wide, e.g., in a range from about 350 pm to about 400 pm. This may result in color aberration and its consequential decrease in resolution when a projection lens is made of a material that allows for transmission of ultraviolet rays including the KrF laser light and the ArF laser light. It is therefore necessary to narrow the spectral line width of the laser light to be outputted from the gas laser apparatus to an extent in which the color aberration is negligible. To narrow the spectral line width, a line narrowing module or "LNM" including a line narrowing device may be provided in a laser resonator of the gas laser apparatus. Non-limiting examples of the line narrowing device may include an etalon and a grating. In the following description, the laser apparatus that allows for narrowing of the spectral line width is referred to as a line narrowing laser apparatus.

SUMMARY

A laser apparatus according to an embodiment of the disclosure may include: a first laser resonator configured to generate a laser beam; a first optical element configured to adjust a divergence in a first direction of the laser beam; a second optical element configured to adjust a divergence in a second direction of the laser beam, in which the second direction may be perpendicular to the first direction; a measuring unit configured to measure the divergence in the first direction and the divergence in the second direction of the laser beam; and a controller configured to control one or both of the first optical element and the second optical element, based on the divergence in the first direction and the divergence in the second direction of the laser beam both measured by the measuring unit.

BRIEF DESCRIPTION OF THE DRAWINGS

Some example embodiments of the disclosure are described below as mere examples with reference to the accompanying drawings.

In the drawings, a solid arrow denotes one or both of an input and an output of a signal, and a dashed arrow denotes traveling of light.

DETAILED DESCRIPTION

Figure 1:
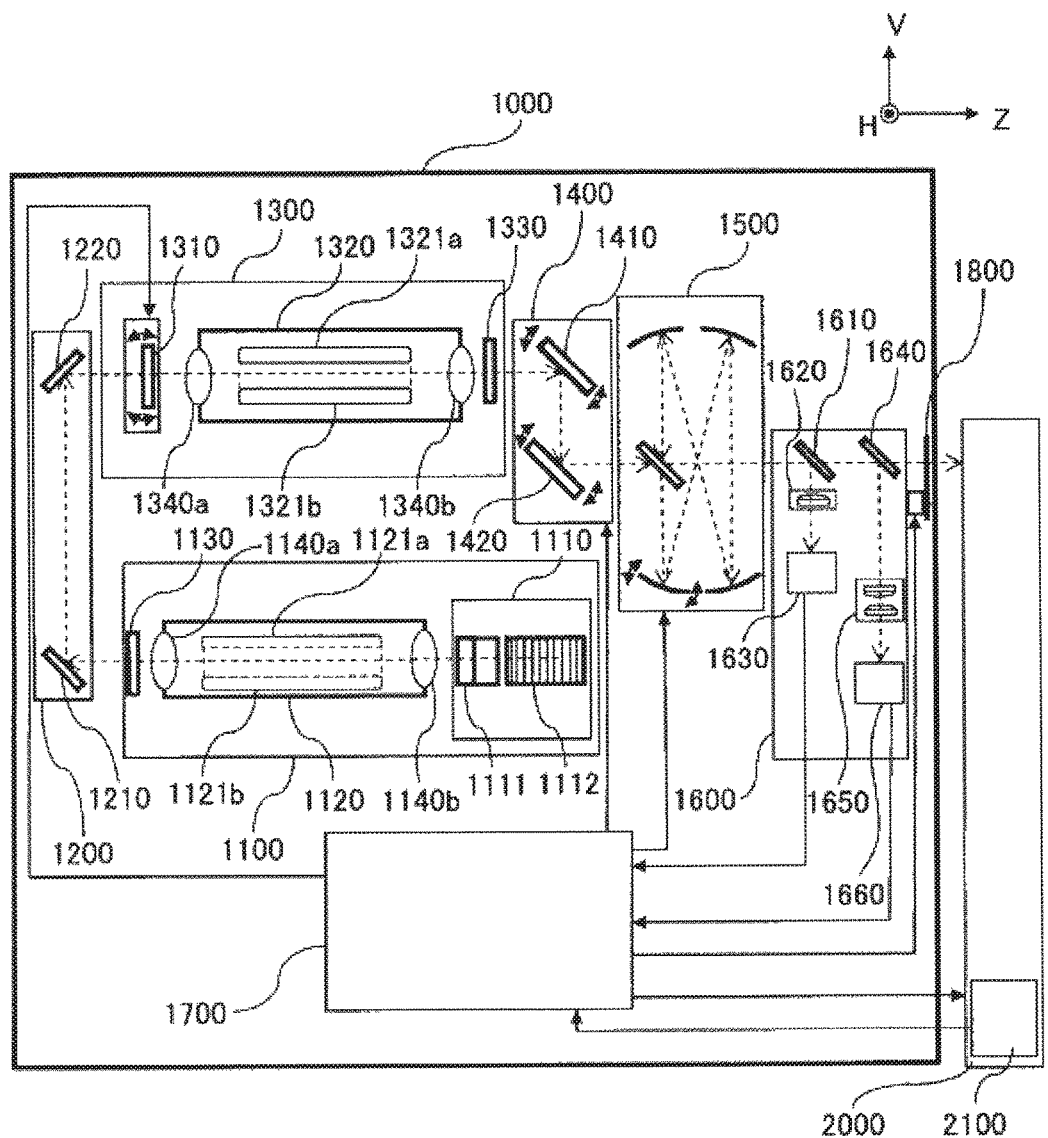
FIG. 1 illustrates an example of an overall configuration of a laser apparatus according to a first example embodiment of the disclosure.

Contents
1. Outline
2. Laser Apparatus according to First Example Embodiment of Disclosure
  2.1 Configuration of Laser Apparatus
  2.2 Operation of Laser Apparatus
  2.3 Beam Characteristic Measuring Unit provided in Laser Apparatus
  2.4 Control of Mirror in Power Oscillator Resonator
  2.5 Control of Mirror in Optical Pulse Stretcher
  2.6 Control of Mirror in Power Oscillator Beam Steering Unit
  2.7 Flowcharts directed to Stabilization of Beam Characteristics
3. Laser Apparatus according to Second Example Embodiment of Disclosure
4. Laser Apparatus according to Third Example Embodiment of Disclosure
5. Laser Apparatus according to Fourth Example Embodiment of Disclosure
6. Other Elements
  6.1 Actuator Mirror Holder
  6.2 Controller In the following, some example embodiments of the disclosure are described in detail with reference to the drawings. Embodiments to be described below each illustrate one example of the disclosure and are not intended to limit the contents of the disclosure. Also, all of the configurations and operations described in each embodiment are not necessarily essential for the configurations and operations of the disclosure. Note that the like elements are denoted with the same reference numerals, and any redundant description thereof is omitted.

[1. Outline]

An example embodiment of the disclosure may relate to a laser apparatus. An example embodiment of the disclosure may be directed to a laser apparatus that makes it possible to stabilize, within a predetermined range, a characteristic of a laser beam to be outputted from the laser apparatus. Non-limiting examples of the characteristic of the laser beam to be outputted from the laser apparatus may include a divergence of the laser beam, a pointing of the laser beam, and a position of the laser beam. The divergence may be a spread angle of the laser beam. The pointing may be a traveling direction of the laser beam. The position may be a central position of the laser beam.

A laser apparatus according to an example embodiment of the disclosure may be a laser apparatus directed to exposure. The exposure laser apparatus may be a laser apparatus directed to a semiconductor exposure apparatus.

The laser apparatus according to the example embodiment of the disclosure may be a discharge-excited gas laser apparatus. The discharge-excited gas laser apparatus may, for laser oscillation, apply a predetermined voltage to a pair of electrodes disposed in a chamber and thereby perform electric discharge and excitation of a laser gas fed into the chamber. The laser gas may be, for example, an excimer laser gas as a mixture of a noble gas, a halogen gas, and a buffer gas. The noble gas may be, for example, an argon (Ar) gas or a krypton (Kr) gas. The halogen gas may be, for example, a fluorine ($F_2$) gas. The buffer gas may be, for example, a neon (Ne) gas.

The laser apparatus may be required to stabilize, within a predetermined range, the characteristic of the laser beam for a longer period of time. For example, the laser apparatus may be required to stabilize, within a predetermined range, a beam characteristic of laser light to be outputted from the laser apparatus, in order to allow a performance of an exposure apparatus that performs exposure of a wafer to be stabilized.

For example, a fluctuation in characteristic of a laser beam may possibly occur upon switching operations of a laser apparatus from a stop of the laser apparatus to a high-load operation of the laser apparatus. For example, the fluctuation in characteristic of the laser beam may possibly occur upon switching operations of the laser apparatus from a low-load operation of the laser apparatus to the high-load operation of the laser apparatus. For example, the fluctuation in characteristic of the laser beam may possibly occur upon switching operations of the laser apparatus from the high-load operation of the laser apparatus to the low-load operation of the laser apparatus. The term "low-load operation" may refer to an operation that involves a relatively-low average output, eg., involves a duty upon a burst operation in a range from 5% to 20%. The term "high-load operation" may refer to an operation that involves a relatively-high average output, e.g., involves the duty upon the burst operation in a range from 60% to 100%. Upon performing the switching of the operations of the laser apparatus as described above by way of examples, the divergence and the pointing of the laser beam to be outputted from the laser apparatus may possibly exceed their respective allowable ranges, for example. The laser apparatus may be required to stabilize, for example, the divergence and the pointing of the laser beam to be outputted from the laser apparatus within their respective allowable ranges upon performing the switching of the operations of the laser apparatus as described above by way of example.

An object of an example embodiment of the disclosure may be to provide a laser apparatus that makes it possible to stabilize, within a predetermined range, a characteristic of a laser beam to be outputted from the laser apparatus.

A laser apparatus according to an example embodiment of the disclosure may include a first laser resonator, a first optical element, a second optical element, a measuring unit, and a controller. The first laser resonator may be configured to generate a laser beam. The first optical element may be configured to adjust a divergence in a first direction of the laser beam. The second optical element may be configured to adjust a divergence in a second direction of the laser beam. The second direction may be perpendicular to the first direction. The measuring unit may be configured to measure the divergence in the first direction and the divergence in the second direction of the laser beam. The controller may be configured to control one or both of the first optical element and the second optical element, based on the divergence in the first direction and the divergence in the second direction of the laser beam both measured by the measuring unit.

The laser apparatus may further include a third optical element. The third optical element may be configured to adjust a pointing of the laser beam. The measuring unit may further measure the pointing of the laser beam. The controller may further control the third optical element, based on the pointing of the laser beam measured by the measuring unit.

The laser apparatus may further include a fourth optical element. The fourth optical element may be configured to adjust a position of the laser beam. The measuring unit may further measure the position of the laser beam. The controller may further control the fourth optical element, based on the position of the laser beam measured by the measuring unit.

An example embodiment of the disclosure may make it possible to provide the laser apparatus that stabilizes, within a predetermined range, a characteristic of the laser beam to be outputted from the laser apparatus.

For example, the laser apparatus may control one or both of the first optical element and the second optical element, based on the divergence in the first direction and the divergence in the second direction of the laser beam both measured by the measuring unit. Hence, the laser apparatus may make it possible to stabilize, within a predetermined range, the divergence of the laser beam to be outputted from the laser apparatus.

For example, the laser apparatus may control the third optical element, based on the pointing of the laser beam measured by the measuring unit. Hence, the laser apparatus may make it possible to stabilize, within a predetermined range, the pointing of the laser beam to be outputted fromrn the laser apparatus.

For example, the laser apparatus may control the fourth optical element, based on the position of the laser beam measured by the measuring unit. Hence, the laser apparatus may make it possible to stabilize, within a predetermined range, the position of the laser beam to be outputted from the laser apparatus.

[2. Laser Apparatus According to First Example Embodiment of Disclosure]
[2.1 Configuration of Laser Apparatus]

FIG. 1 illustrates an example of an overall configuration of a laser apparatus according to a first example embodiment of the disclosure.

A laser apparatus 1000 may be a discharge-excited gas laser apparatus. The laser apparatus 1000 may be used together with a semiconductor exposure apparatus 2000. The laser apparatus 1000 may output a laser beam. The laser beam outputted from the laser apparatus 1000 may enter the semiconductor exposure apparatus 2000. The semiconductor exposure apparatus 2000 may include an exposure apparatus controller 2100. The exposure apparatus controller 2100 may control the semiconductor exposure apparatus 2000.

The laser apparatus 1000 may include a master oscillator (MO) 1100 and a master oscillator beam steering unit (MO beam steering unit) 1200. The laser apparatus 1000 may include a power oscillator (PO) 1300 and a power oscillator beam steering unit (PO beam steering unit) 1400. The laser apparatus 1000 may include an optical pulse stretcher (OPS) 1500, a beam characteristic measuring unit 1600, a controller 1700, and a shutter 1800.

The master oscillator 1100 may include a line narrowing module (LNM) 1110, a first chamber 1120, and a first output coupler (OC) mirror 1130.

The line narrowing module 1110 may include a prism beam expander 1111 and a grating 1112. The prism beam expander 1111 and the grating 1112 may be adapted to narrow a spectral line width. The prism beam expander 1111 and the grating 1112 may be disposed based on a Littrow layout to bring an incidence angle of the laser light and a diffraction angle of the laser light into coincidence with each other.

The master oscillator 1100 may be a solid-state laser. For example, the master oscillator 1100 may include a line-narrowed configuration that involves a combination of a titanium-sapphire laser and a nonlinear crystal.

The first output coupler mirror 1130 may be a partial reflection mirror. The partial reflection mirror may involve a reflectance in a range from 20% to 30%. The line narrowing module 1110 and the first output coupler mirror 1130 may be so disposed as to form a resonator. The first chamber 1120 may be disposed in an optical path of the resonator.

The first chamber 1120 may include a pair of discharge electrodes 1121a and 1121b and two windows 1140a and 1140b. The discharge electrodes 1121a and 1121b may be so disposed as to face each other. The first chamber 1120 may be filled with an excimer laser gas. The excimer laser gas may be a mixture of a noble gas (an Ar gas or a Kr gas), a halogen gas (an $F_2$ gas), and a buffer gas (an Ne gas). The windows 1140a and 1140b may allow the laser beam to be transmitted therethrough.

The master oscillator beam steering unit 1200 may include a first high-reflection mirror 1210 and a second high-reflection mirror 1220. The first high-reflection mirror 1210 and the second high-reflection mirror 1220 may be so disposed as to allow the laser beam outputted from the master oscillator 1100 to enter the power oscillator 1300.

The power oscillator 1300 may include a rear mirror 1310, a second chamber 1320, and a second output coupler mirror 1330. The rear mirror 1310 and the second output coupler mirror 1330 may be so disposed as to form a resonator. The second chamber 1320 may be disposed in an optical path of the resonator. The power oscillator 1300 may include a ring resonator.

The second chamber 1320 may include a pair of discharge electrodes 1321a and 1321b and two windows 1340a and 1340b as with the first chamber 1120. The second chamber 1320 may be filled with the excimer laser gas.

The rear mirror 1310 may be a partial reflection mirror that involves a reflectance in a range from 80% to 90%. The second output coupler mirror 1330 may be a partial reflection mirror that involves a reflectance in a range from 20% to 30%. The rear mirror 1310 may be held by an actuator mirror holder. The actuator mirror holder may make it possible to change an angle of posture of the rear mirror 1310.

The power oscillator beam steering unit 1400 may include a third high-reflection mirror 1410 and a fourth high-reflection mirror 1420. The third high-reflection mirror 1410 may be held by an actuator mirror holder that makes it possible to change an angle of posture of the third high-reflection mirror 1410. The fourth high-reflection mirror 1420 may be held by an actuator mirror holder that makes it possible to change an angle of posture of the fourth high-reflection mirror 1420. The third high-reflection mirror 1410 and the fourth high-reflection mirror 1420 may be so disposed as to allow the laser beam outputted from the power oscillator 1300 to enter the optical pulse stretcher 1500.

The optical pulse stretcher 1500 may include a beam splitter and four high-reflection concave mirrors. The beam splitter may involve a reflectance of about 60%. The beam splitter and the four high-reflection concave mirrors may be so disposed as to allow the laser beam reflected from the beam splitter to be further reflected from the four high-reflection concave mirrors, and as to allow the laser beam having been reflected from the four high-reflection concave mirrors to be focused onto the beam splitter, One or more of the four high-reflection concave mirrors may be held by an actuator mirror holder that makes it possible to change an angle of posture of the corresponding high-reflection concave mirror. The laser apparatus 1000 may include a plurality of optical pulse stretchers S.

The beam characteristic measuring unit 1600 may include a system that measures the divergence and the pointing of the laser beam, and a system that measures a profile and a position of the laser beam. The system that measures the divergence and the pointing of the laser beam may include a first beam splitter 1610, a light condensing optical system 1620, and a first image sensor 1630. The first image sensor 1630 may be disposed at a focal point of the light condensing optical system 1620. The system that measures the profile and the position of the laser beam may include a second beam splitter 1640, a transfer optical system 1650, and a second image sensor 1660. The second image sensor 1660 may be disposed at a focal point of the transfer optical system 1650.

[2.2 Operation of Laser Apparatus]

The controller 1700 may supply the semiconductor exposure apparatus 2000 with a signal that indicates abnormality in characteristic of the laser beam, and may close the shutter 1800.

The controller 1700 may apply, with use of an unillustrated power supply in the master oscillator 1100, a pulsed high voltage between the pair of discharge electrodes 1121a and 1121b at a predetermined repetition frequency. The repetition frequency may be, for example, 1000 Hz.

The controller 1700 may apply, with use of an unillustrated power supply in the power oscillator 1300, a pulsed high voltage between the pair of discharge electrodes 1321a and 1321b at a predetermined repetition frequency. The repetition frequency may be, for example, 1000 Hz. Causing electric discharge in the first chamber 1120 may excite the excimer laser gas. As a result of the excitation of the excimer laser gas, the line-narrowed pulsed laser beam may be outputted, by means of the resonator formed by the line narrowing module 1110 and the first output coupler mirror 1130, from the first output coupler mirror 1130.

The pulsed laser beam outputted from the master oscillator 1100 may enter the rear mirror 1310 of the power oscillator 1300 through the master oscillator beam steering unit 1200.

The pulsed laser beam may be transmitted through the rear mirror 1310, following which electric discharge may be generated in the second chamber 1320 to excite the laser gas in the second chamber 1320. The pulsed laser beam may be amplified by the Fabry-Perot resonator formed by the rear mirror 1310 and the second output coupler mirror 1330. The amplified pulsed laser beam may be outputted from the second output coupler mirror 1330.

The pulsed laser beam outputted from the second output coupler mirror 1330 may pass through the power oscillator beam steering unit 1400. The pulsed laser beam having passed through the power oscillator beam steering unit 1400 may enter the optical pulse stretcher 1500. A pulse width of the pulsed laser beam may be stretched by the optical pulse stretcher 1500.

The pulsed laser beam having passed through the optical pulse stretcher 1500 may pass through an unillustrated monitor module and may enter the beam characteristic measuring unit 1600. The monitor module may measure factors such as pulse energy, a spectral line width, and a wavelength of the pulsed laser beam.

The beam characteristic measuring unit 1600 may cause a part of the pulsed laser beam to be reflected from the first beam splitter 1610. The part of the pulsed laser beam reflected from the first beam splitter 1610 may pass through the light condensing optical system 1620 to be focused onto the first image sensor 1630. The divergence and the pointing of the laser beam may be measured based on the pulsed laser beam focused onto the first image sensor 1630. The beam characteristic measuring unit 1600 may cause another part of the pulsed laser beam to be reflected from the second beam splitter 1640. The part of the pulsed laser beam reflected from the second beam splitter 1640 may pass through the transfer optical system 1650 to be focused onto the second image sensor 1660. The profile and the position of the laser beam may be measured based on the pulsed laser beam focused onto the second image sensor 1660.

The controller 1700 may control the angle of posture of the rear mirror 1310 in the power oscillator 1300, based on the characteristic of the laser beam measured by the beam characteristic measuring unit 1600. The controller 1700 may control the angle of posture of one or more of the high-reflection concave mirrors in the optical pulse stretcher 1500, based on the characteristic of the laser beam measured by the beam characteristic measuring unit 1600. The controller 1700 may control the angle of posture of one or both of the third high-reflection mirror 1410 and the fourth high-reflection mirror 1420 in the power oscillator beam steering unit 1400, based on the characteristics of the laser beam measured by the beam characteristic measuring unit 1600.

[Control (a)]

The controller 1700 may control the angle of posture of the rear mirror 1310 in the power oscillator 1300, based on the divergence in a horizontal direction and the divergence in a vertical direction of the laser beam measured by the beam characteristic measuring unit 1600. The angle of posture of the rear mirror 1310 in the power oscillator 1300 may be so controlled that the aimed divergences of the laser beam are obtained. The controller 1700 may control the angle of posture of one or more of the high-reflection concave mirrors in the optical pulse stretcher 1500, based on the divergences in the horizontal and the vertical directions of the laser beam measured by the beam characteristic measuring unit 1600. The angle of posture of one or more of the high-reflection concave mirrors in the optical pulse stretcher 1500 may be so controlled that the aimed divergences of the laser beam are obtained.

[Control (b)]

The controller 1700 may control the angle of posture of one or both of the third high-reflection mirror 1410 and the fourth high-reflection mirror 1420 in the power oscillator beam steering unit 1400, based on the pointing and the position in the horizontal direction and the pointing and the position in the vertical direction of the laser beam measured by the beam characteristic measuring unit 1600. The angle of posture of one or both of the third high-reflection mirror 1410 and the fourth high-reflection mirror 1420 in the power oscillator beam steering unit 1400 may be so controlled that the aimed pointings and the aimed positions of the laser beam are obtained.

[Control (c)]

The control (a) and the control (b) may be repeated until the characteristics of the laser beam measured by the beam characteristic measuring unit 1600 fall within their allowable ranges.

[Control (d)]

The controller 1700 may stop the foregoing adjusting oscillation and open the shutter 1800, when the characteristics of the laser beam measured by the beam characteristic measuring unit 1600 fall within their allowable ranges. The controller 1700 may notify an exposure apparatus controller 2100 in the semiconductor exposure apparatus 2000 of confirmation on the characteristics of the laser beam.

The controller 1700 may receive from the exposure apparatus controller 2100 a trigger on laser oscillation.

The controller 1700 may apply, in synchronization with the trigger received from the exposure apparatus controller 2100, the respective voltages between the pair of discharge electrodes 1121a and 1121b of the master oscillator 1100 and between the pair of discharge electrodes 1321a and 1321b of the power oscillator 1300. The electric discharge of the laser gas contained in the first chamber 1120 of the master oscillator 1100 and the electric discharge of the laser gas contained in the second chamber 1320 of the power oscillator 1300 may thus be generated. Hence, the laser beam with the desired characteristics may be outputted from the laser apparatus 1000.

The controller 1700 may repeat the control (a) and the control (b) described above during the exposure of a wafer performed by the semiconductor exposure apparatus 2000. The characteristics of the laser beam may be stabilized even while the exposure of the wafer performed by the semiconductor exposure apparatus 2000 is carried out.

The stabilization of any characteristic of the pulsed laser beam to be outputted from the laser apparatus 1000 may thus be possible, by controlling, based on any characteristic of the laser beam measured by the beam characteristic measuring unit 1600, one or more of: the angle of posture of the rear mirror 1310 in the power oscillator 1300; the angle of posture of one or more of the high-reflection concave mirrors in the optical pulse stretcher 1500; and the angle of posture of one or both of the third high-reflection mirror 1410 and the fourth high-reflection mirror 1420 in the power oscillator beam steering unit 1400.

[2.3 Beam Characteristic Measuring Unit Provided in Laser Apparatus]

Figure 2A:
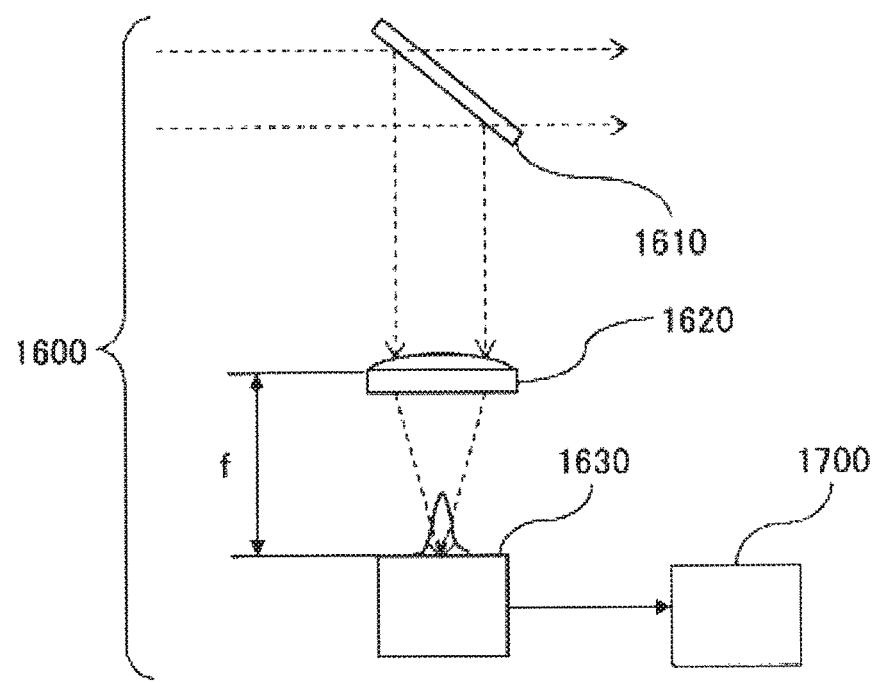
FIG. 2A is a cross-sectional view of an example of a part of a beam characteristic measuring unit provided in the laser apparatus according to the first example embodiment of the disclosure.
Figure 2B:
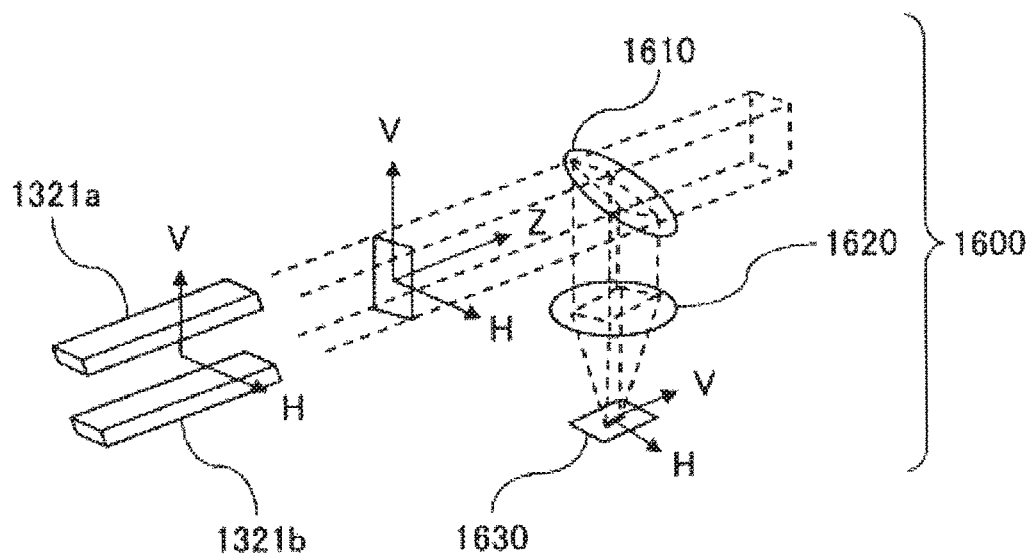
FIG. 2B is a perspective view of the example of the part of the beam characteristic measuring unit provided in the laser apparatus according to the first example embodiment of the disclosure.

FIG. 2A is a cross-sectional view of an example of a part of the beam characteristic measuring unit provided in the laser apparatus according to the first example embodiment of the disclosure, FIG. 2B is a perspective view of the example of the part of the beam characteristic measuring unit provided in the laser apparatus according to the first example embodiment of the disclosure.

The part of the beam characteristic measuring unit 1600 illustrated by way of example in FIGS. 2A and 2B may be the system that measures the divergence and the pointing of the laser beam. A part of the laser beam outputted from the optical pulse stretcher 1500 may be reflected from the first beam splitter 1610 to enter the light condensing optical system 1620, For example, the light condensing optical system 1620 may include a single lens or a plurality of lenses. The laser beam having passed through the light condensing optical system 1620 may be focused onto the first image sensor 1630. The first image sensor 1630 may be located at a position of a focal distance "f" of the light condensing optical system 1620. The first image sensor 1630 may be a two-dimensional charge-coupled device (CCD). The profile of the laser beam focused by the light condensing optical system 1620 may be measured by the first image sensor 1630. The profile of the laser beam measured by the first image sensor 1630 may be sent to the controller 1700.

The controller 1700 may calculate the divergence "θ" of the laser beam, based on the expression: θ=W/f, where "f" may be the focal distance of the light condensing optical system, and "W" may be a width of the profile of the laser beam at a predetermined height of the profile of the laser beam. For example, "W" may be a full width of the profile of the laser beam at a height defined by $1/e^2$ of the height of the profile of the laser beam.

The controller 1700 may calculate the divergence "θ" of the laser beam, based on the width W of the profile of the laser beam at the predetermined height of the profile of the laser beam measured by the first image sensor 1630.

The laser apparatus 1000 that may be a discharge-excited gas laser apparatus may typically satisfy a relationship: $\theta_V > \theta_H$, where $\theta_H$ may be the divergence of the laser beam in the horizontal direction "H", and $\theta_V$ may be the divergence of the laser beam in the vertical direction "V". The vertical direction V may be a direction of an electric field to be applied by the pair of discharge electrodes 1321a and 1321b. The horizontal direction H may be a direction perpendicular to the vertical direction V and a traveling direction "Z" of the laser beam. The controller 1700 may calculate the divergence $\theta_H$ in the horizontal direction H of the laser beam, based on a width in the horizontal direction H of the profile of the laser beam at the predetermined height of the profile of the laser beam measured by the first image sensor 1630. The controller 1700 may calculate the divergence $\theta_V$ in the vertical direction V of the laser beam, based on a width in the vertical direction V of the profile of the laser beam at the predetermined height of the profile of the laser beam measured by the first image sensor 1630.

The controller 1700 may calculate the pointing of the laser beam, based on a central position of the profile of the laser beam measured by the first image sensor 1630. The pointing may be the traveling direction of the laser beam.

Figure 3A:
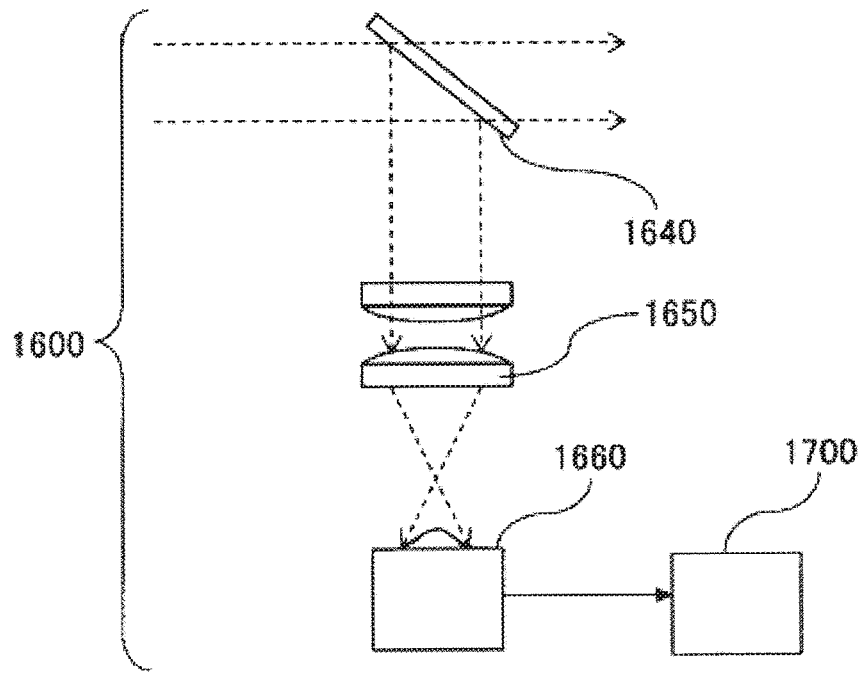
FIG. 3A is a cross-sectional view of an example of a part of the beam characteristic measuring unit provided in the laser apparatus according to the first example embodiment of the disclosure.
Figure 3B:
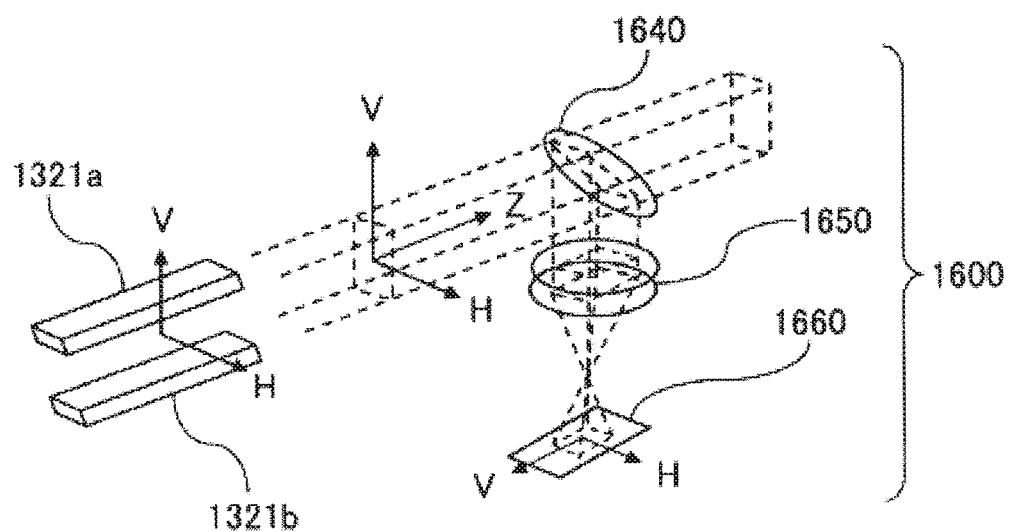
FIG. 3B is a perspective view of the example of the part of the beam characteristic measuring unit provided in the laser apparatus according to the first example embodiment of the disclosure.

FIG. 3A is a cross-sectional view of an example of a part of the beam characteristic measuring unit provided in the laser apparatus according to the first example embodiment of the disclosure. FIG. 3B is a perspective view of the example of the part of the beam characteristic measuring unit provided in the laser apparatus according to the first example embodiment of the disclosure.

The part of the beam characteristic measuring unit 1600 illustrated by way of example in FIGS. 3A and 3B may be the system that measures the profile and the position of the laser beam. Another part of the laser beam outputted from the optical pulse stretcher 1500 may be reflected from the second beam splitter 1640 to enter the transfer optical system 1650. For example, the transfer optical system 1650 may include a plurality of lenses. The laser beam having passed through the transfer optical system 1650 may be transferred onto the second image sensor 1660. A configuration of the transfer optical system 1650 and a layout of the second image sensor 1660 may be so determined that the magnification of the profile of the laser beam meets the predetermined magnification "M". The second image sensor 1660 may be a two-dimensional charge-coupled device (CCD). The profile of the laser beam transferred by the transfer optical system 1650 may be measured by the second image sensor 1660. The profile of the laser beam measured by the second image sensor 1660 may be sent to the controller 1700.

The controller 1700 may calculate the position of the laser beam, based on a central position of the profile of the laser beam measured by the second image sensor 1660.

The controller 1700 may calculate the position in the horizontal direction H of the laser beam, based on the central position in the horizontal direction H of the profile of the laser beam measured by the second image sensor 1660. The controller 1700 may calculate the position in the vertical direction V of the laser beam, based on the central position in the vertical direction V of the profile of the laser beam measured by the second image sensor 1660. The vertical direction V may be the direction of the electric field to be applied by the pair of discharge electrodes 1321a and 1321b. The horizontal direction H may be the direction perpendicular to the vertical direction V and the traveling direction Z of the laser beam.

[2.4 Control of Mirror in Power Oscillator Resonator]

Figure 4A:
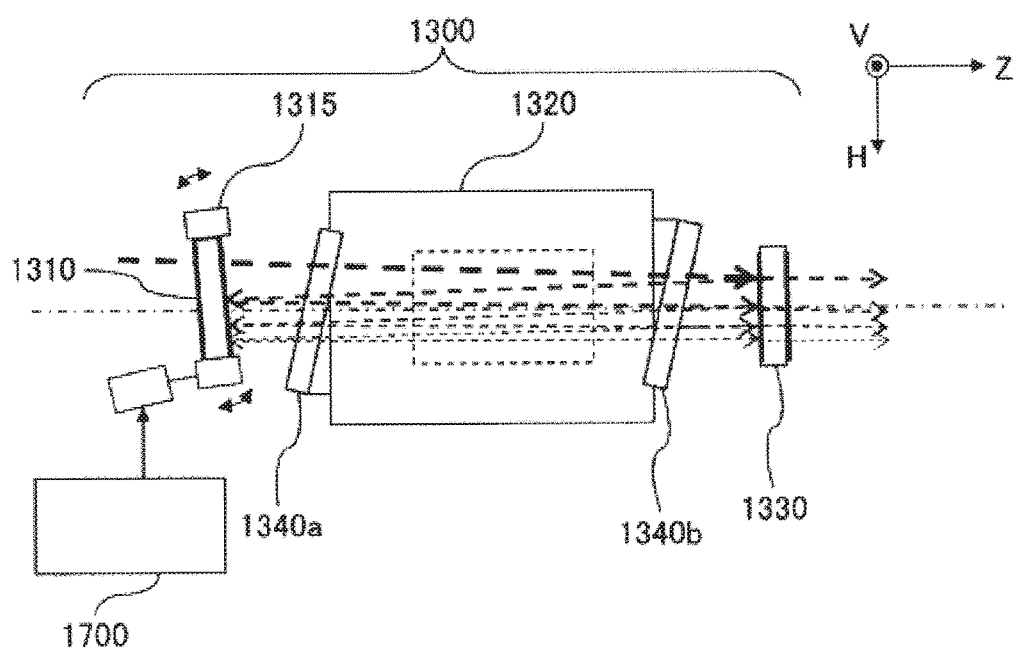
FIG. 4A illustrates an example of an operation of controlling a mirror in a power oscillator resonator provided in the laser apparatus according to the first example embodiment of the disclosure.
Figure 4B:
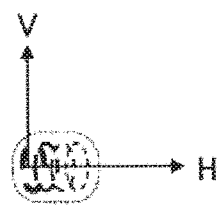
FIG. 4B illustrates an example of an effect of controlling the mirror in the power oscillator resonator provided in the laser apparatus according to the first example embodiment of the disclosure.

FIG. 4A illustrates an example of an operation of controlling a mirror in the power oscillator resonator provided in the laser apparatus according to the first example embodiment of the disclosure. FIG. 4B illustrates an example of an effect of controlling the mirror in the power oscillator resonator provided in the laser apparatus according to the first example embodiment of the disclosure.

The power oscillator 1300 illustrated by way of example in FIG. 4A may include a configuration that forms the Fabry-Perot resonator. The power oscillator 1300 may include the rear mirror 1310, the second chamber 1320, and the second output coupler mirror 1330. The second chamber 1320 may include the pair of discharge electrodes 1321a and 1321b and the two windows 1340a and 1340b. The rear mirror 1310 may be held by an actuator mirror holder 1315. The actuator mirror holder 1315 may be so controlled by the controller 1700 as to change the angle of posture of the rear mirror 1310.

The divergence of the laser beam may be controlled by changing the angle of posture of one or both of the rear mirror 1310 and the second output coupler mirror 1330 in the power oscillator 1300. For example, the angle of posture of the rear mirror 1310 in the power oscillator 1300 may be changed to control the divergence of the laser beam.

The rear mirror 1310 may be so disposed as to be slightly tilted relative to an optical axis of the resonator. The rear mirror 1310 of the power oscillator 1300 may be so disposed at the angle of posture that an output angle in the horizontal direction H of the laser beam is changed depending on the number of reciprocation of the laser beam between the rear mirror 1310 and the second output coupler mirror 1330.

An optical path length of the resonator in the power oscillator 1300 may be larger than a temporal coherence length of the laser beam in the master oscillator 1100.

Referring by way of example to FIG. 4A, the laser beam reflected from the second high-reflection mirror 1220 may pass through the rear mirror 1310 and may then pass through the window 1340a of the power oscillator 1300 to enter the second chamber 1320 obliquely to the optical axis of the resonator. The laser beam that enters the second chamber 1320 may involve a narrower spectrum width. The laser beam may be amplified by the electric discharge generated across the discharge electrodes 1321a and 1321b provided in the second chamber 1320. The amplified laser beam may pass through the window 1340b. A part of the laser beam having passed through the window 1340b may pass through the second output coupler mirror 1330 to be outputted from the power oscillator 1300 as a laser beam that has undergone the reciprocation for 0.5 times. The laser beam reflected from the second output coupler mirror 1330 at a reflection angle α1 may pass through the window 1340b to be amplified in the second chamber 1320. The laser beam amplified in the second chamber 1320 may pass through the window 1340a to enter the rear mirror 1310.

The laser beam reflected from the rear mirror 1310 at a reflection angle β1 may pass through the window 1340a to be amplified in the second chamber 1320, following which the amplified laser beam may pass through the window 1340b to enter the second output coupler mirror 1330. The laser beam reflected from the second output coupler mirror 1330 at a reflection angle α2 may pass through the window 1340b to be amplified in the second chamber 1320, following which the amplified laser beam may pass through the window 1340a to enter the rear mirror 1310. The laser beam reflected from the rear mirror 1310 at a reflection angle β2 may pass through the window 1340a to be amplified in the second chamber 1320, following which the amplified laser beam may pass through the window 1340b to enter the second output coupler mirror 1330.

The reflection angles of the laser beam reflected from the rear mirror 1310 and the second output coupler mirror 1330 may involve a relationship defined by "α1>β1>α2>β2>, etc.".

The direction of the laser beam to be outputted from the second output coupler mirror 1330 may be changed for each reciprocation of the laser beam, by changing the angle of posture in the horizontal direction H of the rear mirror 1310 relative to an optical axis of the second output coupler mirror 1330 in the example manner described above. Hence, the divergence of the laser beam to be outputted from the second output coupler mirror 1330 may be increased. Coherency may be suppressed between the laser beam that passes through the second output coupler mirror 1330 and the laser beam that passes through the second output coupler mirror 1330 following the reflection from the second output coupler mirror 1330 and the subsequent reflection from the rear mirror 1310.

Referring by way of example to FIG. 4B, the laser beam that passes through the second output coupler mirror 1330 may be shifted in the horizontal direction H depending on the reciprocation of the laser beam between the rear mirror 1310 and the second output coupler mirror 1330. The composite resultant of the laser beam following the shift in the horizontal direction H and the passage through the second output coupler mirror 1330 may be the laser beam that involves a larger divergence in the horizontal direction H.

The angle of posture of the rear mirror 1310 may be changed in the horizontal direction H in the example manner described above to increase the divergence in the horizontal direction H of the laser beam.

Similarly, the angle of posture of the rear mirror 1310 may be changed in the vertical direction V to increase the divergence in the vertical direction V of the laser beam.

Further, an angle of posture of the second output coupler mirror 1330 relative to an optical axis of the rear mirror 1310 may be similarly changed instead of changing the angle of posture of the rear mirror 1310 relative to the optical axis of the second output coupler mirror 1330. The angle of posture of the rear mirror 1310 relative to the optical axis of the second output coupler mirror 1330 may preferably be changed in order to reduce changes in direction and position of the laser beam to be outputted from the second output coupler mirror 1330.

[2.5 Control of Mirror in Optical Pulse Stretcher]

Figure 5A:
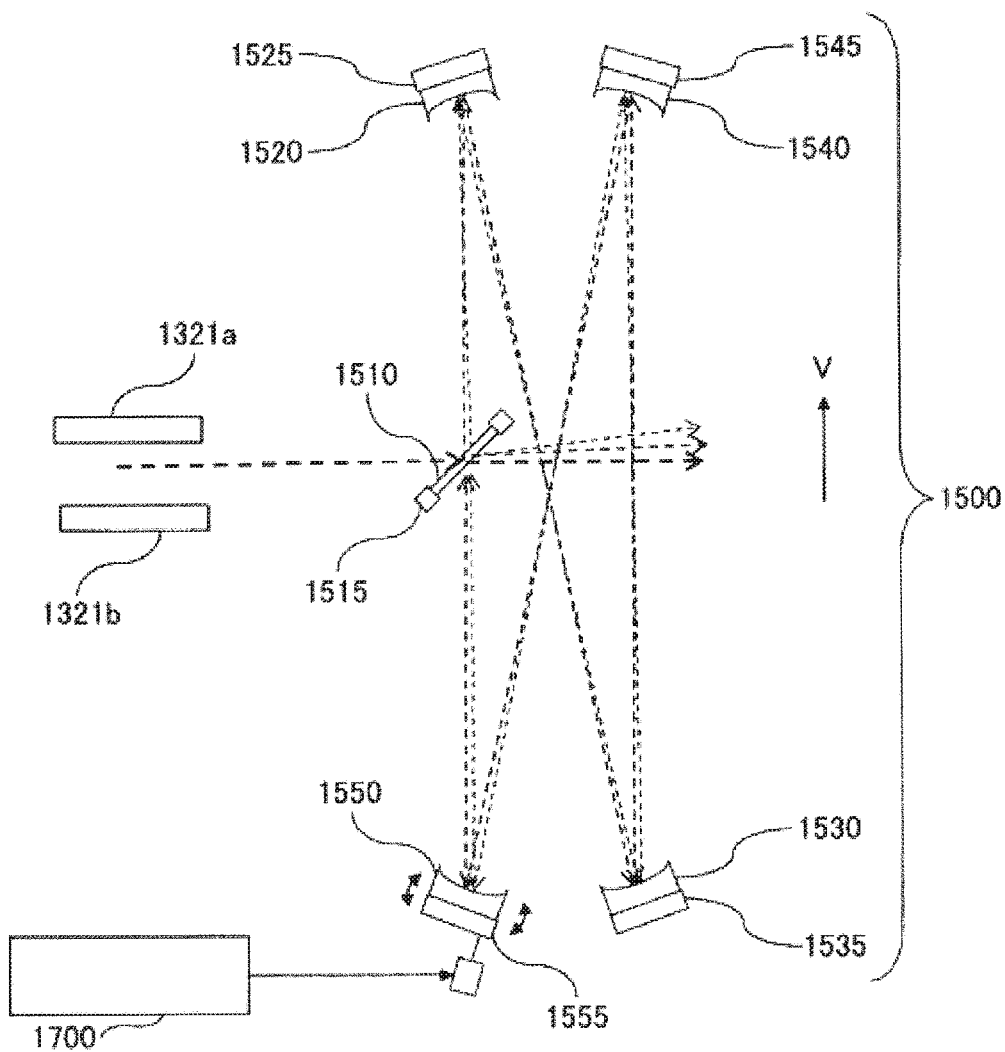
FIG. 5A illustrates an example of an operation of controlling a mirror in an optical pulse stretcher provided in the laser apparatus according to the first example embodiment of the disclosure.
Figure 5B:
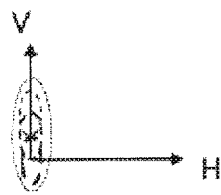
FIG. 5B illustrates an example of an effect of controlling the mirror in the optical pulse stretcher provided in the laser apparatus according to the first example embodiment of the disclosure.

FIG. 5A illustrates an example of an operation of controlling a mirror in the optical pulse stretcher provided in the laser apparatus according to the first example embodiment of the disclosure. FIG. 5B illustrates an example of an effect of controlling the mirror in the optical pulse stretcher provided in the laser apparatus according to the first example embodiment of the disclosure.

The optical pulse stretcher 1500 illustrated by way of example in FIG. 5A may include the beam splitter 1510 and the four high-reflection concave mirrors, ie., a first high-reflection concave mirror 1520, a second high-reflection concave mirror 1530, a third high-reflection concave mirror 1540, and a fourth high-reflection concave mirror 1550. The beam splitter 1510 may be held by a beam splitter holder 1515. The first high-reflection concave mirror 1520 may be held by a first mirror holder 1525. The second high-reflection concave mirror 1530 may be held by a second mirror holder 1535. The third high-reflection concave mirror 1540 may be held by a third mirror holder 1545. The fourth high-reflection concave mirror 1550 may be held by an actuator mirror holder 1555. The actuator mirror holder 1555 may be so controlled by the controller 1700 as to change the angle of posture of the fourth high-reflection concave mirror 1550.

The first high-reflection concave mirror 1520, the second high-reflection concave mirror 1530, the third high-reflection concave mirror 1540, and the fourth high-reflection concave mirror 1550 may be concave mirrors that involve the same focal distance F.

The beam splitter 1510 and the four high-reflection concave mirrors 1520, 1530, 1540, and 1550 may be so disposed as to cause the laser beam reflected from the beam splitter 1510 to enter the beam splitter 1510 again. The first high-reflection concave mirror 1520 and the second high-reflection concave mirror 1530 may be so disposed that the profile of the laser beam reflected from the beam splitter 1510 is transferred at the magnification of 1 (one). The third high-reflection concave mirror 1540 and the fourth high-reflection concave mirror 1550 may be so disposed that the profile of the laser beam reflected from the second high-reflection concave mirror 1530 is transferred at the magnification of 1. The beam splitter 1510 and the four high-reflection concave mirrors 1520, 1530, 1540, and 1550 may be so disposed that the profile of the laser beam reflected from the beam splitter 1510 is transferred at the magnification of 1 at the beam splitter 1510. In other words, the optical pulse stretcher 1500 may be an erecting optical pulse stretcher.

Referring by way of example to FIG. 1, the amplified laser beam outputted from the power oscillator 1300 may enter the optical pulse stretcher 1500 through the power oscillator beam steering unit 1400. A part of the laser beam that has entered the optical pulse stretcher 1500 may pass through the beam splitter 1510, whereas another part of the laser beam that has entered the optical pulse stretcher 1500 may be reflected from the beam splitter 1510. The laser beam reflected from the beam splitter 1510 may enter the first high-reflection concave mirror 1520.

The laser beam that has entered the first high-reflection concave mirror 1520 may be reflected from the first high-reflection concave mirror 1520. The laser beam reflected from the first high-reflection concave mirror 1520 may be focused as an inverted image of the laser beam derived from the beam splitter 1510. The laser beam reflected from the first high-reflection concave mirror 1520 may enter the second high-reflection concave mirror 1530.

The laser beam that has entered the second high-reflection concave mirror 1530 may be reflected from the second high-reflection concave mirror 1530. The laser beam reflected from the second high-reflection concave mirror 1530 may be focused as an inverted image of the above-mentioned inverted image of the laser beam, i.e., focused as an erected image of the laser beam derived from the beam splitter 1510. The laser beam reflected from the second high-reflection concave mirror 1530 may enter the third high-reflection concave mirror 1540.

The laser beam that has entered the third high-reflection concave mirror 1540 may be reflected from the third high-reflection concave mirror 1540. The laser beam reflected from the third high-reflection concave mirror 1540 may be focused as an inverted image of the above-mentioned erected image of the laser beam, i.e., focused as an inverted image of the laser beam derived from the beam splitter 1510. The laser beam reflected from the third high-reflection concave mirror 1540 may enter the fourth high-reflection concave mirror 1550.

The laser beam that has entered the fourth high-reflection concave mirror 1550 may be reflected from the fourth high-reflection concave mirror 1550. The laser beam reflected from the fourth high-reflection concave mirror 1550 may be focused as an inverted image of the above-mentioned inverted image of the laser beam, i.e., focused as an erected image of the laser beam derived from the beam splitter 1510. The laser beam reflected from the fourth high-reflection concave mirror 1550 may enter the beam splitter 1510 again. The laser beam thus-reflected from the fourth high-reflection concave mirror 1550 may enter the beam splitter 1510 as the erected image of the laser beam derived from the beam splitter 1510.

A part of light that has entered the beam splitter 1510 again may be reflected from the beam splitter 1510 to be outputted from the optical pulse stretcher 1500. Another part of the light that has entered the beam splitter 1510 again may pass through the beam splitter 1510, following which the light that has passed through the beam splitter 1510 may enter the beam splitter 1510 through the four high-reflection concave mirrors 1520, 1530, 1540, and 1550.

The optical pulse stretcher 1500 may use the four high-reflection concave mirrors 1520, 1530, 1540, and 1550 that serve as a delay circuit to delay an output of a part of the laser beam that enters the beam splitter 1510. Hence, the optical pulse stretcher 1500 may stretch a pulse width of a part of the laser beam that enters the beam splitter 1510. An optical path length of the above-described delay circuit may be larger than a temporal coherence length of the laser beam. This may make it possible to suppress generation of an interference fringe between a part of the laser beam that passes through the beam splitter 1510 and the laser beam reflected from the beam splitter 1510 through the delay circuit.

A traveling direction of the laser beam to be outputted through the delay circuit may be changed by changing the angle of posture of one or more of the four high-reflection concave mirrors 1520, 1530, 1540, and 1550. In the optical pulse stretcher 1500, the traveling direction of the laser beam to be outputted through the delay circuit may be changed to change the divergence of the laser beam to be outputted from the laser apparatus 1000.

For example, referring by way of example to FIG. 5A, the angle of posture of the fourth high-reflection concave mirror 1550 may be so changed in the vertical direction V as to cause the laser beam to be outputted from the optical pulse stretcher 1500 to be shifted in the vertical direction V. Changing the angle of posture of the fourth high-reflection concave mirror 1550 in the vertical direction V may shift, in the vertical direction V, the laser beam to be outputted from the optical pulse stretcher 1500 through the delay circuit as illustrated by way of example in FIG. 5B, for example. The composite resultant of the laser beam following the shift in the vertical direction V and the output from the optical pulse stretcher 1500 through the delay circuit may be the laser beam that involves a larger divergence in the vertical direction V. The angle of posture of the fourth high-reflection concave mirror 1550 may be changed in the vertical direction V in the example manner described above to increase the divergence in the vertical direction V of the laser beam to be outputted from the laser apparatus 1000.

A part of the laser beam reflected from the beam splitter 1510 may be outputted as an erected image from the beam splitter 1510 through the delay circuit. The erected image of the laser beam outputted from the optical pulse stretcher 1500 through the delay circuit may be shifted in the vertical direction V.

The angle of posture of one or more of the four high-reflection concave mirrors 1520, 1530, 1540, and 1550 may be changed in the vertical direction V to change the divergence in the vertical direction V of the laser beam. The angle of posture of one or more of the four high-reflection concave mirrors 1520, 1530, 1540, and 1550 may be changed in the horizontal direction H to change the divergence in the horizontal direction H of the laser beam.

An angle of posture of the beam splitter 1510 may be changed in the vertical direction V to change the divergence in the vertical direction V of the laser beam. The angle of posture of the beam splitter 1510 may be changed in the horizontal direction H to change the divergence in the horizontal direction H of the laser beam.

[2.6 Control of Mirror in Power Oscillator Beam Steering Unit]

Figure 6:
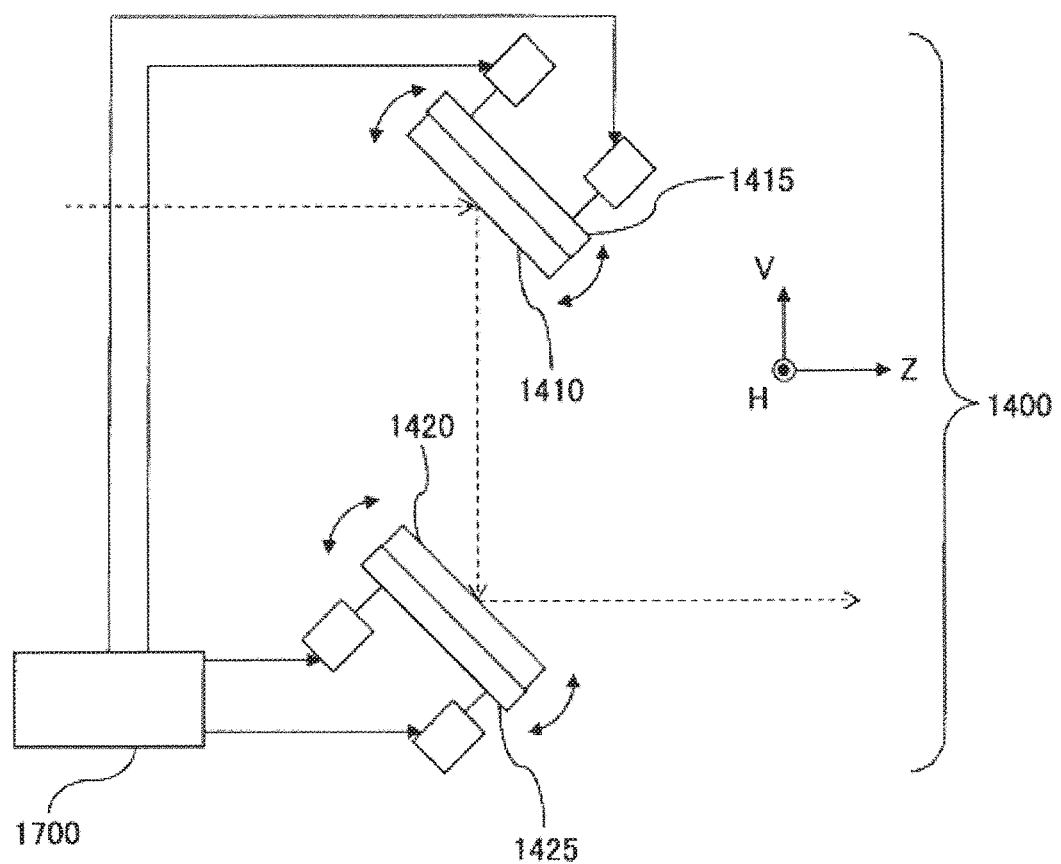
FIG. 6 illustrates an example of controlling mirrors in a power oscillator beam steering unit provided in the laser apparatus according to the first example embodiment of the disclosure.

FIG. 6 illustrates an example of controlling mirrors in the power oscillator beam steering unit provided in the laser apparatus according to the first example embodiment of the disclosure.

The power oscillator beam steering unit 1400 illustrated by way of example in FIG. 6 may include the third high-reflection mirror 1410 and the fourth high-reflection mirror 1420. The third high-reflection mirror 1410 may be held by an actuator mirror holder 1415. The fourth high-reflection mirror 1420 may be held by an actuator mirror holder 1425. The actuator mirror holder 1415 may change the angle of posture of the third high-reflection mirror 1410 biaxially, e.g., in the horizontal direction H and the vertical direction V. The actuator mirror holder 1425 may change the angle of posture of the fourth high-reflection mirror 1420 biaxially, e.g., in the horizontal direction II and the vertical direction V. The actuator mirror holders 1415 and 1425 each may be controlled by the controller 1700.

The third high-reflection mirror 1410 and the fourth high-reflection mirror 1420 may be disposed in an optical path of the laser beam from the power oscillator 1300 to the optical pulse stretcher 1500.

The controller 1700 may so control the actuator mirror holders 1415 and 1425 as to change the angle of posture of the third high-reflection mirror 1410 and the angle of posture of the fourth high-reflection mirror 1420.

The angle of posture of the third high-reflection mirror 1410 and the angle of posture of the fourth high-reflection mirror 1420 each may be changed biaxially to change the pointing and the position of the laser beam. The pointing may be a traveling direction of the laser beam. The position may be a central position of the laser beam.

[2.7 Flowcharts Directed to Stabilization of Beam Characteristics]

Figure 7:
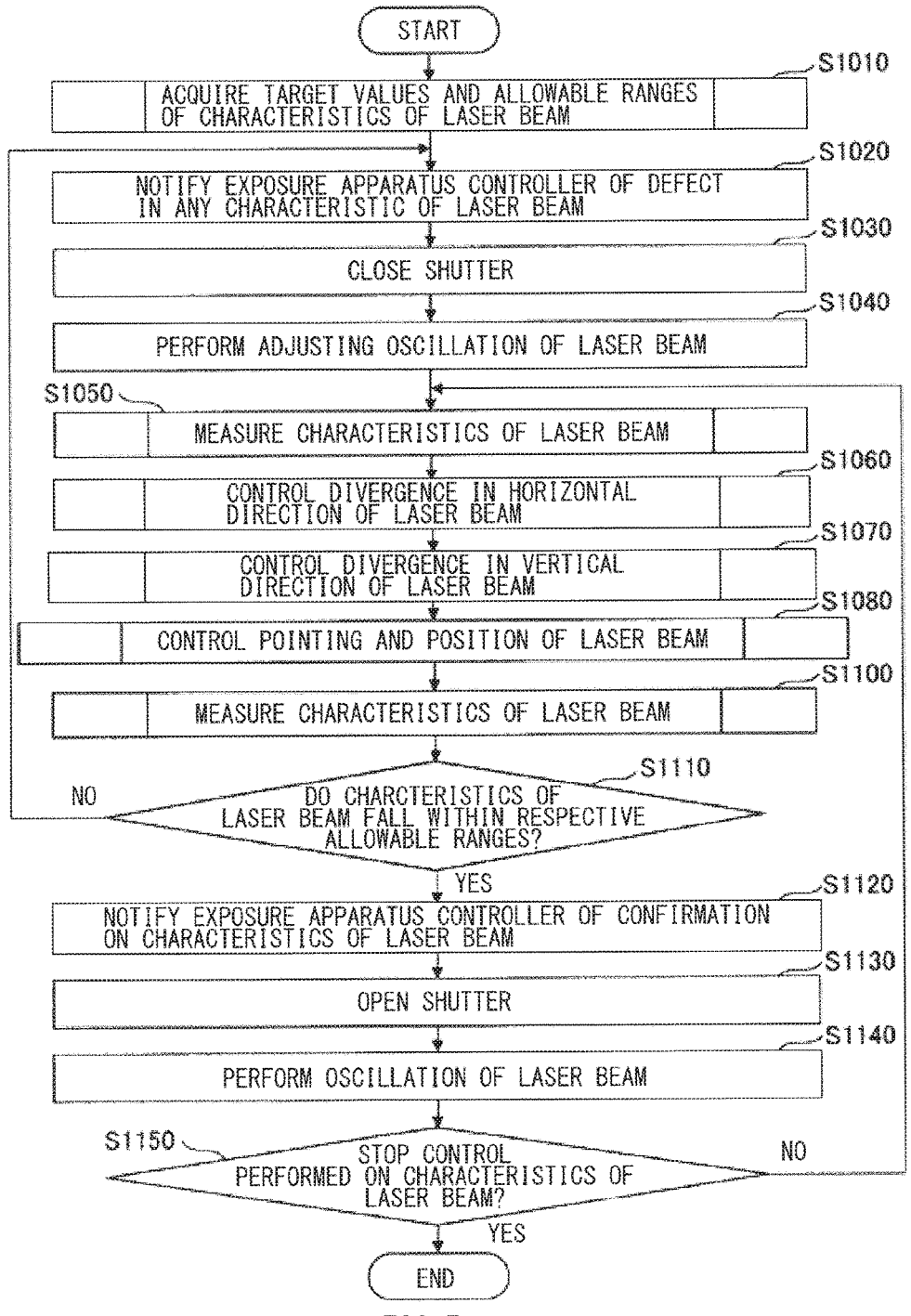
FIG. 7 illustrates an example of a main routine of a method of controlling the laser apparatus according to the first example embodiment of the disclosure.

FIG. 7 illustrates an example of a main routine of a method of controlling the laser apparatus according to the first example embodiment of the disclosure.

In step S1010, the controller 1700 may execute a subroutine that acquires target values and allowable ranges of the characteristics of the laser beam to be outputted from the laser apparatus 1000. The characteristics may include the divergence, the pointing, and the position. The controller 1700 may receive data on the target values and the allowable ranges of the characteristics of the laser beam from the exposure apparatus controller 2100. The controller 1700 may read data on the target values and the allowable ranges of the characteristics of the laser beam from an unillustrated memory in the controller 1700.

The rear mirror 1310 in the resonator of the power oscillator 1300 may be so disposed in advance that the optical axis of the rear mirror 1310 is brought into coincidence with the optical axis of the second output coupler mirror 1330 substantially. The fourth high-reflection concave mirror 1550 in the optical pulse stretcher 1500 may be so disposed in advance that an optical axis of the fourth high-reflection concave mirror 1550 is directed substantially orthogonal to the traveling direction of the laser beam that enters the beam splitter 1510.

In step S1020, the controller 1700 may notify the exposure apparatus controller 2100 of a defect in any characteristic of the laser beam, in order to perform the adjusting oscillation of the laser beam.

In step S1030, the controller 1700 may close the shutter 1800, in order to prevent the output of the laser beam from the laser apparatus 1000 to the semiconductor exposure apparatus 2000 upon the adjusting oscillation of the laser beam.

In step S1040, the controller 1700 may perform the adjusting oscillation of the laser beam, in order to control the characteristics of the laser beam. The controller 1700 may perform, in the laser apparatus 1000, the laser oscillation that involves a predetermined repetition frequency and a predetermined discharge voltage. The repetition frequency may be, for example, 1000 Hz.

In step S1050, the controller 1700 may execute a subroutine that measures the characteristics, including the divergence, the pointing, and the position, of the laser beam.

In step S1060, the controller 1700 may execute a subroutine that controls the divergence in the horizontal direction I-H of the laser beam. For example, the controller 1700 may so control the angle of posture of the rear mirror 1310 in the power oscillator 1300 that the divergence in the horizontal direction H of the laser beam approaches the divergence that is based on the target value of the divergence in the horizontal direction H of the laser beam.

In step S1070, the controller 1700 may execute a subroutine that controls the divergence in the vertical direction V of the laser beam. For example, the controller 1700 may so control the angle of posture of the fourth high-reflection concave mirror 1550 in the optical pulse stretcher 1500 that the divergence in the vertical direction V of the laser beam approaches the divergence that is based on the target value of the divergence in the vertical direction V of the laser beam.

In step S1080, the controller 1700 may execute a subroutine that controls the pointing of the laser beam and the position of the laser beam. For example, the controller 1700 may so control the angle of posture of the third high-reflection mirror 1410 and the angle of posture of the fourth high-reflection mirror 1420 in the power oscillator beam steering unit 1400 that the pointing and the position of the laser beam respectively approach the pointing and the position that are based on the respective target values of the pointing and the position of the laser beam.

In step S1100, the controller 1700 may execute a subroutine that measures the characteristics of the laser beam.

In step S1110, the controller 1700 may make a determination as to whether the measured characteristics, including the divergence, the pointing, and the position, of the laser beam fall within the respective allowable ranges of the characteristics of the laser beam. The routine executed by the controller 1700 may proceed to step S1120 when the measured characteristics of the laser beam are determined as being within the respective allowable ranges of the characteristics of the laser beam. The routine executed by the controller 1700 may return to the step S1020 when the measured characteristics of the laser beam are determined as being outside of the respective allowable ranges of the characteristics of the laser beam.

In step S1120, the controller 1700 may notify the exposure apparatus controller 2100 of the confirmation on the characteristics of the laser beam, in order to output the laser beam from the laser apparatus 1000 to the semiconductor exposure apparatus 2000.

In step S1130, the controller 1700 may open the shutter 1800, in order to output the laser beam from the laser apparatus 1000 to the semiconductor exposure apparatus 2000.

In step S1140, the controller 1700 may perform the oscillation of the laser beam.

In step S1150, the controller 1700 may make a determination as to whether to stop the control performed on the characteristics of the laser beam. The controller 1700 may end the main routine of the method of controlling the laser apparatus when the controller 1700 determines that the control performed on the characteristics of the laser beam is to be stopped. The routine executed by the controller 1700 may return to the step S1050 when the controller 1700 determines that the control performed on the characteristics of the laser beam is not to be stopped.

Figure 8:
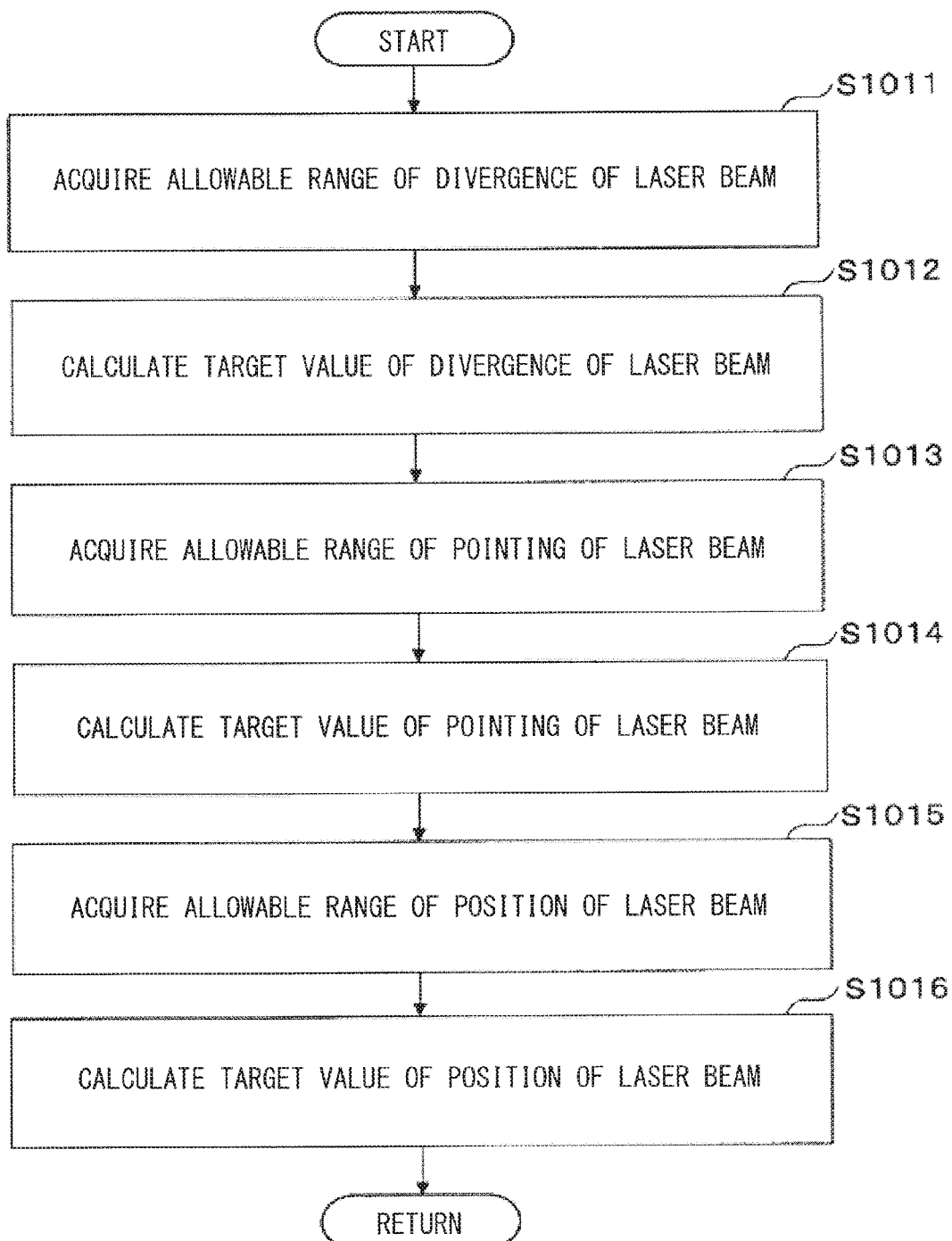
FIG. 8 illustrates an example of a subroutine of the method of controlling the laser apparatus according to the first example embodiment of the disclosure.

FIG. 8 illustrates an example of a subroutine of the method of controlling the laser apparatus according to the first example embodiment of the disclosure.

The subroutine illustrated by way of example in FIG. 8 may be the subroutine (SIO1) directed to the acquisition, as illustrated by way of example in FIG. 7, of the target values and the allowable ranges of the characteristics of the laser beam.

In step S1011, the controller 1700 may acquire the allowable range of the divergence of the laser beam. The controller 1700 may acquire a minimum value $\theta_H$min and a maximum value $\theta_H$max of the allowable range of the divergence in the horizontal direction of the laser beam. The controller 1700 may acquire a minimum value $\theta_V$min and a maximum value $\theta_V$max of the allowable range of the divergence in the vertical direction of the laser beam.

In step S1012, the controller 1700 may calculate the target value of the divergence of the laser beam. The controller 1700 may calculate a target value $\theta_H t$ of the divergence in the horizontal direction of the laser beam. The target value $\theta_H t$ of the divergence in the horizontal direction of the laser beam may be a value that is within the allowable range of the divergence in the horizontal direction of the laser beam, as defined by the expression: $\theta_H\text{min} \le \theta_H t \le \theta_H\text{max}$. The controller 1700 may calculate a target value $\theta_V t$ of the divergence in the vertical direction of the laser beam. The target value $\theta_V t$ of the divergence in the vertical direction of the laser beam may be a value that is within the allowable range of the divergence in the vertical direction of the laser beam, as defined by the expression: $\theta_V\text{min} \le \theta_V t \le \theta_V\text{max}$. The target value $\theta_H t$ of the divergence in the horizontal direction of the laser beam may be an average of the minimum value $\theta_H$min and the maximum value $\theta_H$max of the allowable range of the divergence in the horizontal direction of the laser beam, as defined by the expression: $(\theta_H\text{min}+\theta_H\text{max})/2$. The target value $\theta_V t$ of the divergence in the vertical direction of the laser beam may be an average of the minimum value $\theta_V$min and the maximum value $\theta_V$max of the allowable range of the divergence in the vertical direction of the laser beam, as defined by the expression: $(\theta_V\text{min}+\theta_V\text{max})/2$.

In step S1013, the controller 1700 may acquire the allowable range of the pointing of the laser beam. The controller 1700 may acquire a minimum value $Po_H$min and a maximum value $Po_H$max of the allowable range of the pointing in the horizontal direction of the laser beam. The controller 1700 may acquire a minimum value $Po_V$min and a maximum value $Po_V$max of the allowable range of the pointing in the vertical direction of the laser beam.

In step S1014, the controller 1700 may calculate the target value of the pointing of the laser beam. The controller 1700 may calculate a target value $Po_Ht$ of the pointing in the horizontal direction of the laser beam. The target value $Po_Ht$ of the pointing in the horizontal direction of the laser beam may be a value that is within the allowable range of the pointing in the horizontal direction of the laser beam, as defined by the expression: $Po_H min \le Po_H t \le Po_H max$. The controller 1700 may calculate a target value $Po_V t$ of the pointing in the vertical direction of the laser beam. The target value $Po_V t$ of the pointing in the vertical direction of the laser beam may be a value that is within the allowable range of the pointing in the vertical direction of the laser beam, as defined by the expression: $Po_V min \le Po_V t \le Po_V max$. The target value $PO_H t$ of the pointing in the horizontal direction of the laser beam may be an average of the minimum value $Po_H min$ and the maximum value $Po_H max$ of the allowable range of the pointing in the horizontal direction of the laser beam, as defined by the expression: $(Po_H min + Po_H max)/2$. The target value $Po_V t$ of the pointing in the vertical direction of the laser beam may be an average of the minimum value $Po_V min$ and the maximum value $Po_V max$ of the allowable range of the pointing in the vertical direction of the laser beam, as defined by the expression: $(Po_V min + Po_V max)/2$.

In step S1015, the controller 1700 may acquire the allowable range of the position of the laser beam. The controller 1700 may acquire a minimum value $Bp_H min$ and a maximum value $Bp_H max$ of the allowable range of the position in the horizontal direction of the laser beam. The controller 1700 may acquire a minimum value $Bp_V min$ and a maximum value $Bp_V max$ of the allowable range of the position in the vertical direction of the laser beam.

In step S1016, the controller 1700 may calculate the target value of the position of the laser beam. The controller 1700 may calculate a target value $Bp_H t$ of the position in the horizontal direction of the laser beam. The target value $Bp_H t$ of the position in the horizontal direction of the laser beam may be a value that is within the allowable range of the position in the horizontal direction of the laser beam, as defined by the expression: $Bp_H min \le Bp_H t \le Bp_H max$. The controller 1700 may calculate a target value $Bp_V t$ of the position in the vertical direction of the laser beam. The target value $Bp_V t$ of the position in the vertical direction of the laser beam may be a value that is within the allowable range of the position in the vertical direction of the laser beam, as defined by the expression: $Bp_V min \le Bp_V t \le Bp_V max$. The target value $Bp_H t$ of the position in the horizontal direction of the laser beam may be an average of the minimum value $Bp_H min$ and the maximum value $Bp_H max$ of the allowable range of the position in the horizontal direction of the laser beam, as defined by the expression: $(Bp_H min + Bp_H max)/2$. The target value $Bp_V t$ of the position in the vertical direction of the laser beam may be an average of the minimum value $Bp_V min$ and the maximum value $Bp_V max$ of the allowable range of the position in the vertical direction of the laser beam, as defined by the expression: $(Bp_V min - Bp_V max)/2$.

Figure 9:
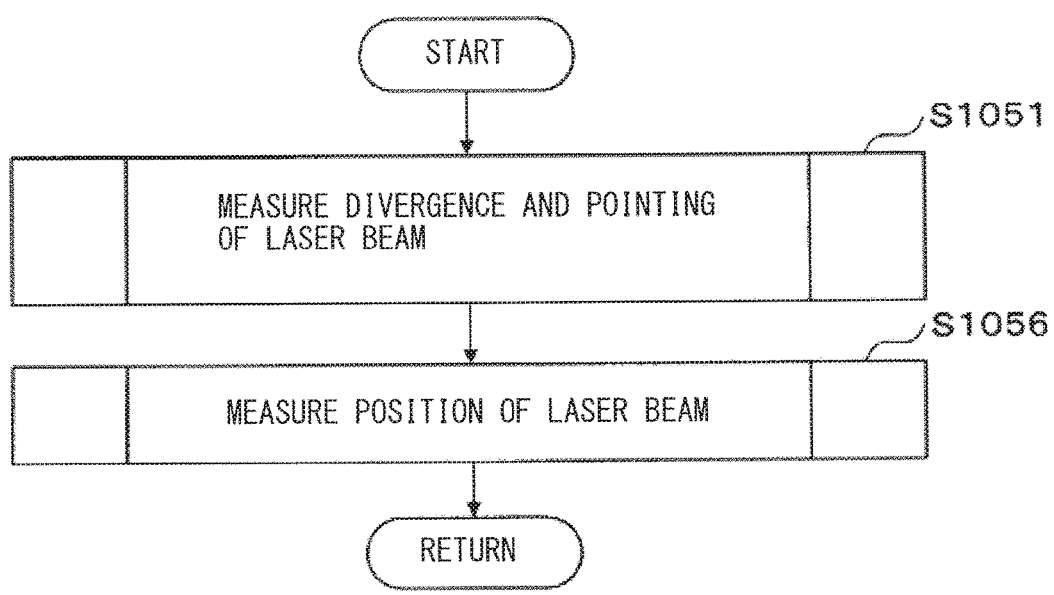
FIG. 9 illustrates an example of a subroutine of the method of controlling the laser apparatus according to the first example embodiment of the disclosure.

FIG. 9 illustrates an example of a subroutine of the method of controlling the laser apparatus according to the first example embodiment of the disclosure.

Figure 14:
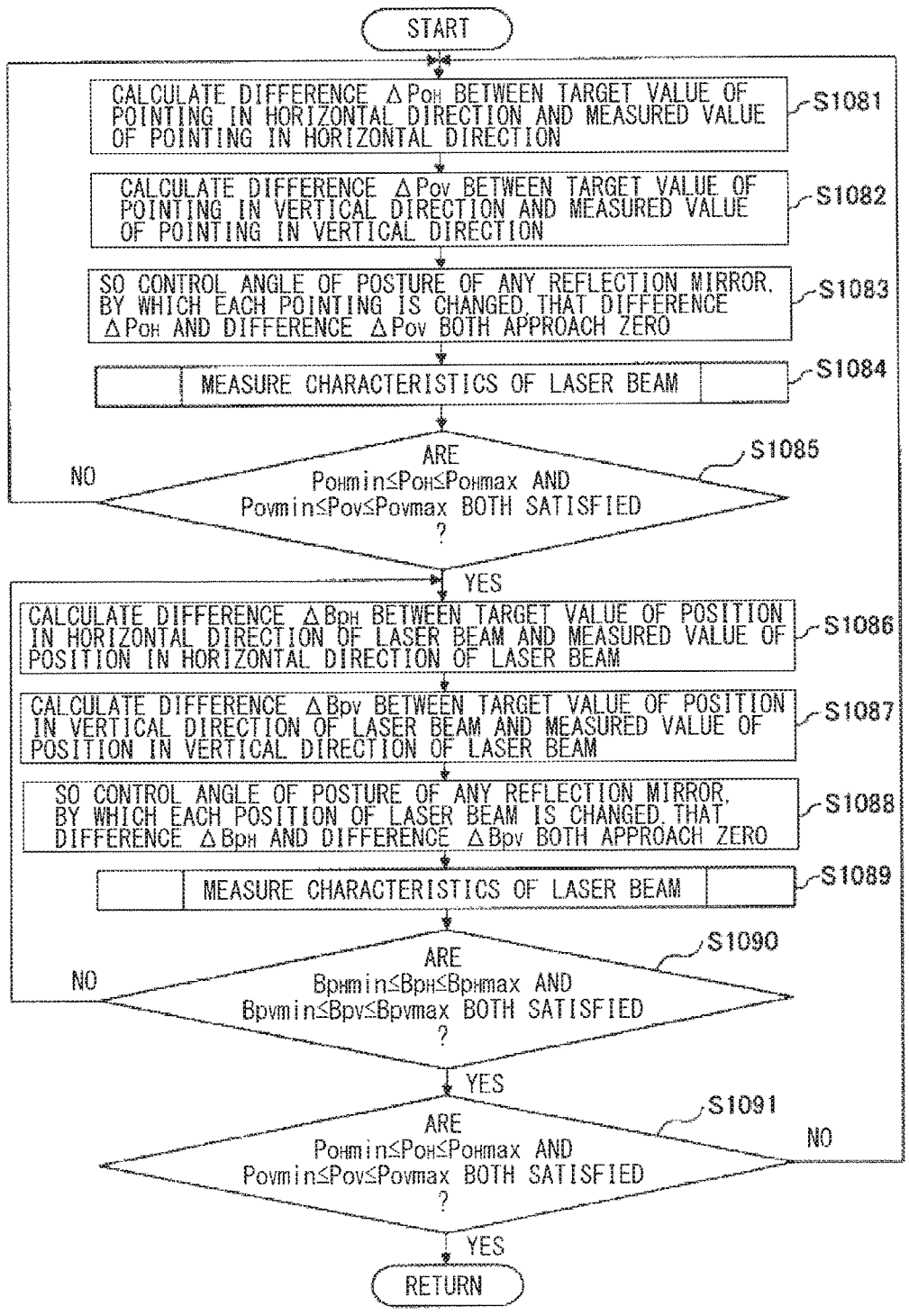
FIG. 14 illustrates an example of a subroutine of the method of controlling the laser apparatus according to the first example embodiment of the disclosure.

The subroutine illustrated by way of example in FIG. 9 may be each of subroutines (S1050, S1100, S1084, and S1089) directed to the measurements, as illustrated by way of example in FIGS. 7 and 14, of the characteristics of the laser beam.

In step S1051, the controller 1700 may execute a subroutine that measures the divergence of the laser beam and the pointing of the laser beam.

In step S1056, the controller 1700 may execute a subroutine that measures the position of the laser beam.

Figure 10A:
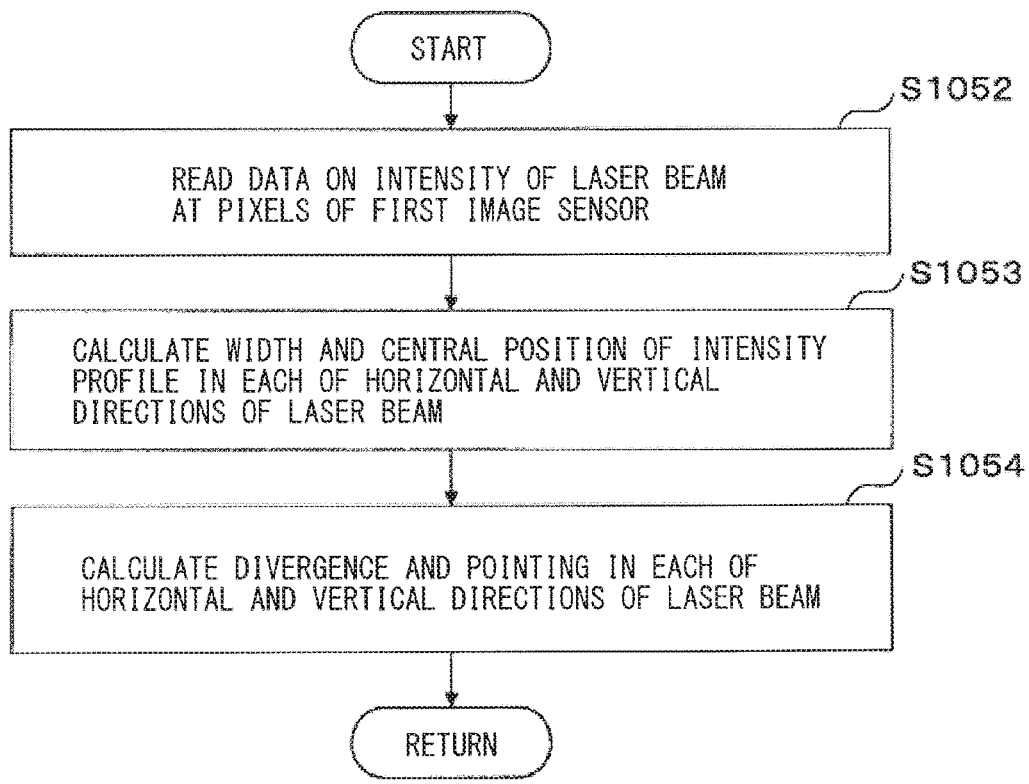
FIG. 10A illustrates an example of a subroutine of the method of controlling the laser apparatus according to the first example embodiment of the disclosure.
Figure 10B:
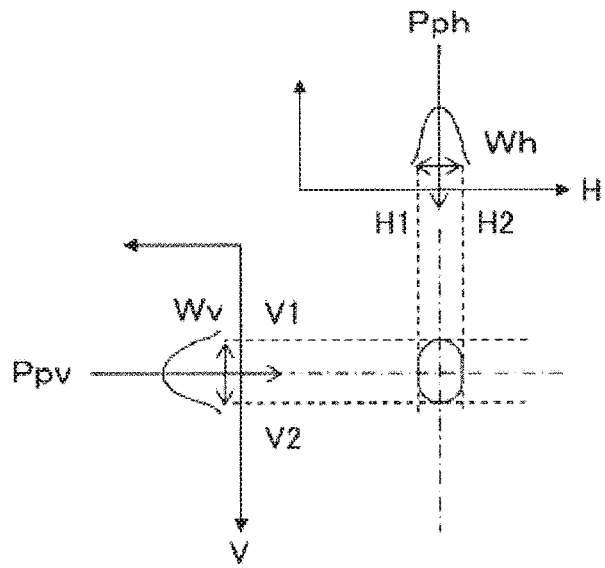
FIG. 10B illustrates an example of a divergence and a pointing of a laser beam in the laser apparatus according to the first example embodiment of the disclosure.

FIG. 10A illustrates an example of a subroutine of the method of controlling the laser apparatus according to the first example embodiment of the disclosure. FIG. 10B illustrates an example of the divergence and the pointing of the laser beam in the laser apparatus according to the first example embodiment of the disclosure.

Figure 12:
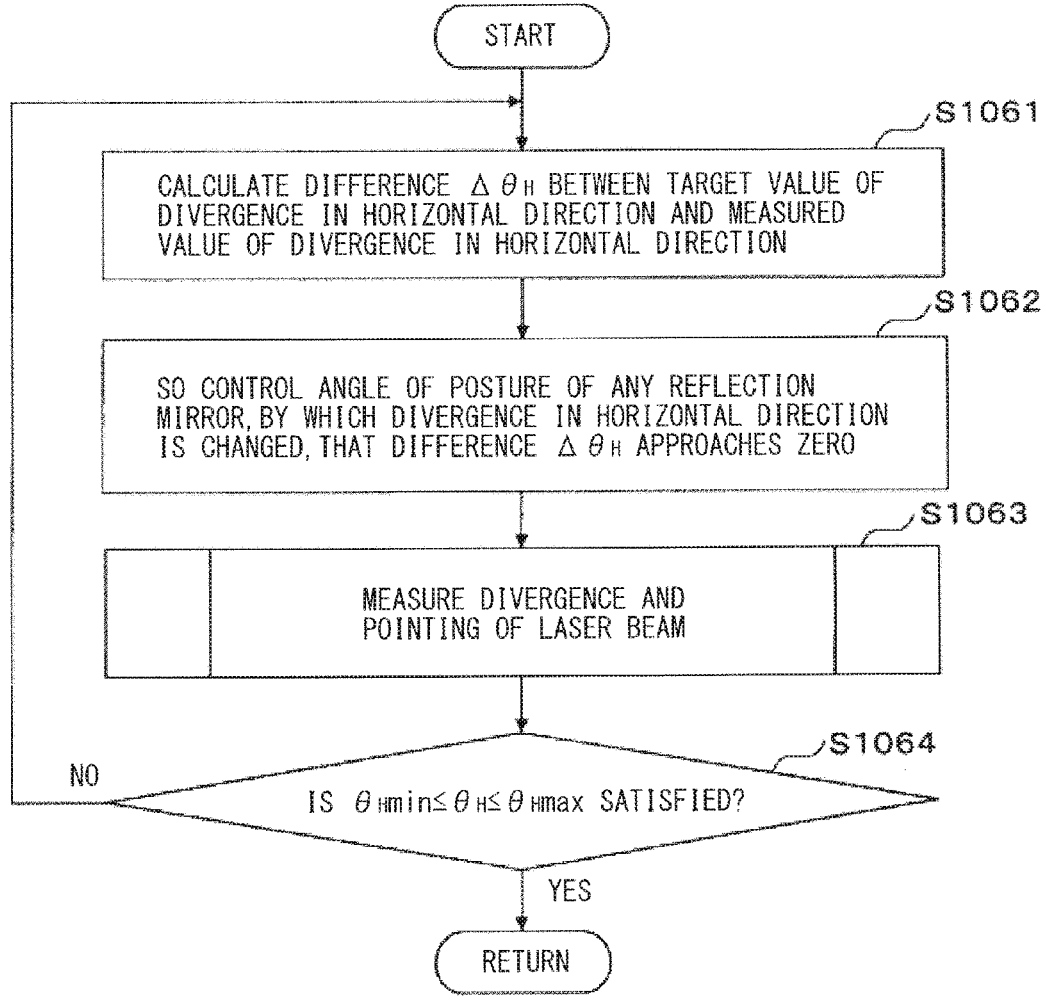
FIG. 12 illustrates an example of a subroutine of the method of controlling the laser apparatus according to the first example embodiment of the disclosure.
Figure 13:
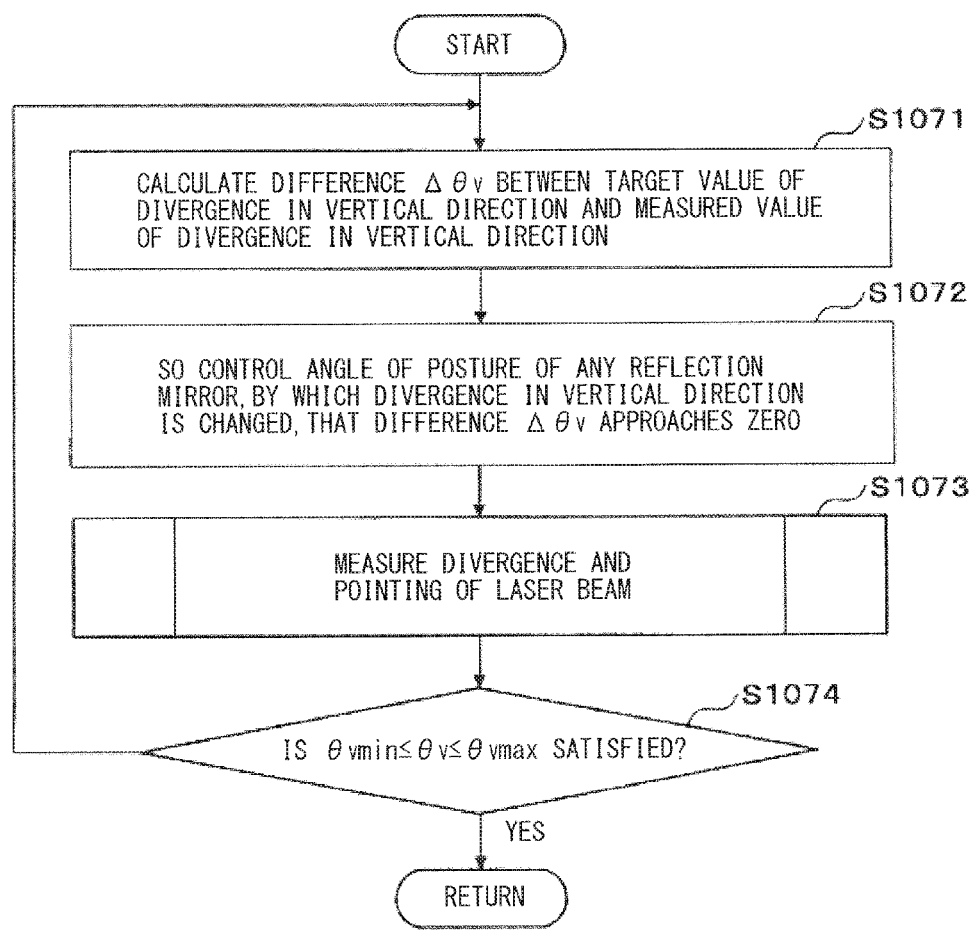
FIG. 13 illustrates an example of a subroutine of the method of controlling the laser apparatus according to the first example embodiment of the disclosure.

The subroutine illustrated by way of example in FIG. 10A may be each of subroutines (S1051, S1063, and S1073) directed to the measurements, as illustrated by way of example in FIGS. 9, 12 and 13, of the divergence of the laser beam and the pointing of the laser beam.

In step S1052, the controller 1700 may read data on an intensity of the laser beam at pixels of the first image sensor 1630. The controller 1700 may obtain intensity profiles of the laser beam derived from the first image sensor 1630, based on the data on the intensity of the laser beam at the pixels of the first image sensor 1630.

In step S1053, the controller 1700 may calculate a width and a central position of the intensity profile in each of the horizontal direction and the vertical direction of the laser beam, based on the intensity profiles of the laser beam derived from the first image sensor 1630.

A width Wh of the intensity profile in the horizontal direction of the laser beam may be calculated based on an interval of coordinates of the intensity profile of the laser beam at a predetermined height of the intensity profile in the horizontal direction of the laser beam. For example, the width Wh of the intensity profile in the horizontal direction of the laser beam may be calculated based on the interval of the coordinates defined by |H2 −H1| of the intensity profile of the laser beam at a height that is $1/e^2$ times the height of a peak of the intensity profile in the horizontal direction of the laser beam, where "e" is the base of the natural logarithm. The predetermined height of the intensity profile in the horizontal direction of the laser beam may be a height that is in a range from 5% to 10% of the height of the peak of the intensity profile in the horizontal direction of the laser beam.

A width Wv of the intensity profile in the vertical direction of the laser beam may be calculated based on an interval of coordinates of the intensity profile of the laser beam at a predetermined height of the intensity profile in the vertical direction of the laser beam. For example, the width Wv of the intensity profile in the vertical direction of the laser beam may be calculated based on the interval of the coordinates defined by |V2−V| of the intensity profile of the laser beam at a height that is $1/e^2$ times the height of a peak of the intensity profile in the vertical direction of the laser beam, where "e" is the base of the natural logarithm. The predetermined height of the intensity profile in the vertical direction of the laser beam may be a height that is in a range from 5% to 10% of the height of the peak of the intensity profile in the vertical direction of the laser beam.

A central position Pph of the intensity profile in the horizontal direction of the laser beam may be calculated based on the center of coordinates of the intensity profile of the laser beam at a predetermined height of the intensity profile in the horizontal direction of the laser beam. For example, the central position Pph of the intensity profile in the horizontal direction of the laser beam may be calculated based on the center of the coordinates defined by (H1+H2)/2 of the intensity profile of the laser beam at the height that is $1/e^2$ times the height of the peak of the intensity profile in the horizontal direction of the laser beam, where "e" is the base of the natural logarithm. The predetermined height of the intensity profile in the horizontal direction of the laser beam may be a height that is in a range from 5% to 10% of the height of the peak of the intensity profile in the horizontal direction of the laser beam.

A central position Ppv of the intensity profile in the vertical direction of the laser beam may be calculated based on the center of coordinates of the intensity profile of the laser beam at a predetermined height of the intensity profile in the vertical direction of the laser beam. For example, the central position Ppv of the intensity profile in the vertical direction of the laser beam may be calculated based on the center of the coordinates defined by (V1+V2)/2 of the intensity profile of the laser beam at the height that is $1/e^2$ times the height of the peak of the intensity profile in the vertical direction of the laser beam, where "e" is the base of the natural logarithm. The predetermined height of the intensity profile in the vertical direction of the laser beam may be a height that is in a range from 5% to 10% of the height of the peak of the intensity profile in the vertical direction of the laser beam.

In step S1054, the controller 1700 may calculate the divergence and the pointing in each of the horizontal direction and the vertical direction of the laser beam.

A divergence $\theta_H$ in the horizontal direction of the laser beam may be calculated from the expression: $\theta_H$=Wh/f, based on the width Wh of the intensity profile in the horizontal direction of the laser beam and the focal distance f of the light condensing optical system 1620.

A divergence $\theta_V$ in the vertical direction of the laser beam may be calculated from the expression: $\theta_V$=Wv/f, based on the width Wv of the intensity profile in the vertical direction of the laser beam and the focal distance f of the light condensing optical system 1620.

A pointing $Po_H$ in the horizontal direction of the laser beam may be calculated from the expression: $Po_H$=Pph/f, based on the central position Pph of the intensity profile in the horizontal direction of the laser beam and the focal distance f of the light condensing optical system 1620.

A pointing $Po_V$ in the vertical direction of the laser beam may be calculated from the expression: $Po_V$=Ppv/f, based on the central position Ppv of the intensity profile in the vertical direction of the laser beam and the focal distance f of the light condensing optical system 1620.

The pointing $Po_H$ in the horizontal direction of the laser beam may be calculated based on the center of gravity of the intensity profile in the horizontal direction of the laser beam and the focal distance f of the light condensing optical system 1620.

The pointing $Po_V$ in the vertical direction of the laser beam may be calculated based on the center of gravity of the intensity profile in the vertical direction of the laser beam and the focal distance f of the light condensing optical system 1620.

Figure 11A:
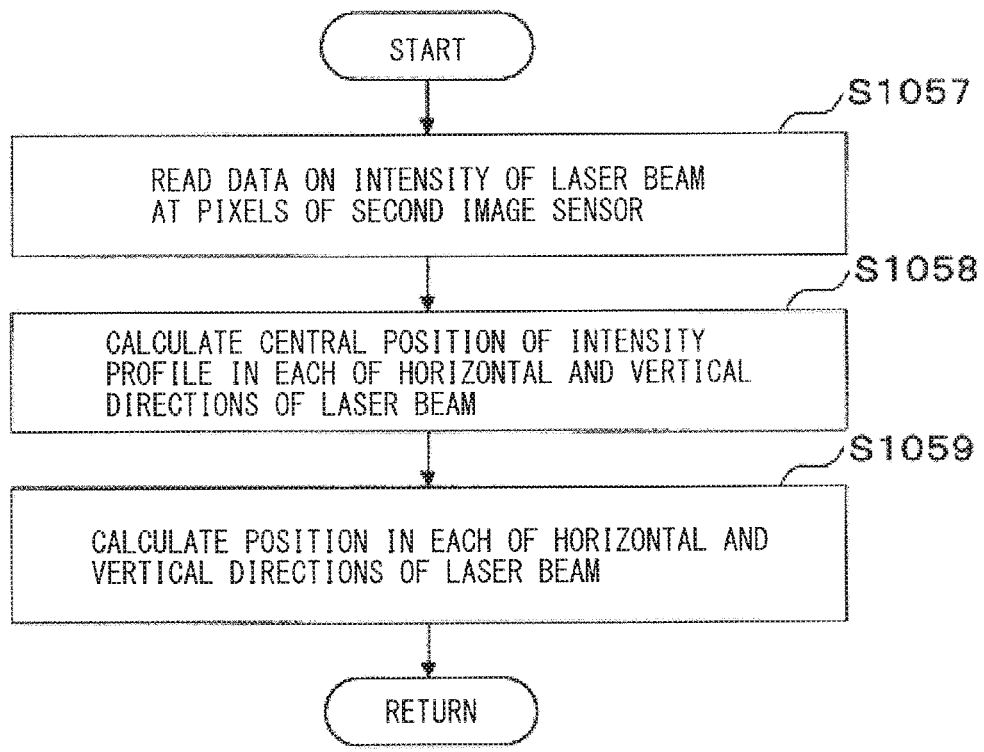
FIG. 11A illustrates an example of a subroutine of the method of controlling the laser apparatus according to the first example embodiment of the disclosure.
Figure 11B:
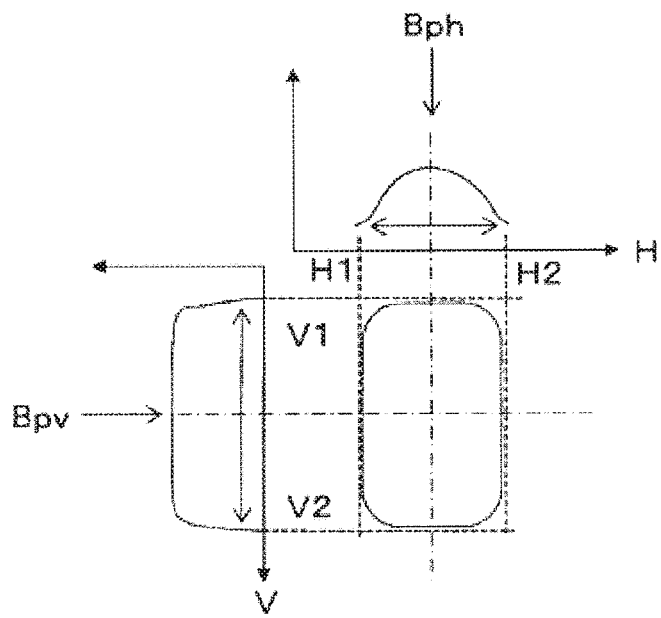
FIG. 11B illustrates an example a position of the laser beam in the laser apparatus according to the first example embodiment of the disclosure.

FIG. 11A illustrates an example of a subroutine of the method of controlling the laser apparatus according to the first example embodiment of the disclosure. FIG. 11B illustrates an example of the position of the laser beam in the laser apparatus according to the first example embodiment of the disclosure.

The subroutine illustrated by way of example in FIG. 11A may be the subroutine (S1056) directed to the measurement, as illustrated by way of example in FIG. 9, of the position of the laser beam.

In step S1057, the controller 1700 may read data on an intensity of the laser beam at pixels of the second image sensor 1660. The controller 1700 may obtain intensity profiles of the laser beam derived from the second image sensor 1660, based on the data on the intensity of the laser beam at the pixels of the second image sensor 1660.

In step S1058, the controller 1700 may calculate a central position of the intensity profile in each of the horizontal direction and the vertical direction of the laser beam, based on the intensity profiles of the laser beam derived from the second image sensor 1660.

A central position Bph of the intensity profile in the horizontal direction of the laser beam may be calculated based on the center of coordinates of the intensity profile of the laser beam at a predetermined height of the intensity profile in the horizontal direction of the laser beam. For example, the central position Bph of the intensity profile in the horizontal direction of the laser beam may be calculated based on the center of the coordinates defined by (H1+H2)/2 of the intensity profile of the laser beam at a height that is $1/e^2$ times the height of a peak of the intensity profile in the horizontal direction of the laser beam, where "e" is the base of the natural logarithm. The predetermined height of the intensity profile in the horizontal direction of the laser beam may be a height that is in a range from 5% to 10% of the height of the peak of the intensity profile in the horizontal direction of the laser beam.

A central position Bpv of the intensity profile in the vertical direction of the laser beam may be calculated based on the center of coordinates of the intensity profile of the laser beam at a predetermined height of the intensity profile in the vertical direction of the laser beam. For example, the central position Bpv of the intensity profile in the vertical direction of the laser beam may be calculated based on the center of the coordinates defined by (V1+V2)/2 of the intensity profile of the laser beam at a height that is $1/e^2$ times the height of a peak of the intensity profile in the vertical direction of the laser beam, where "e" is the base of the natural logarithm. The predetermined height of the intensity profile in the vertical direction of the laser beam may be a height that is in a range from 5% to 10% of the height of the peak of the intensity profile in the vertical direction of the laser beam.

In step S1059, the controller 1700 may calculate the position in each of the horizontal direction and the vertical direction of the laser beam.

A position $Bp_H$ in the horizontal direction of the laser beam may be calculated from the expression: $Bp_H$=Bph/M, based on the central position Bph of the intensity profile in the horizontal direction of the laser beam and the magnification M of the transfer optical system 1650.

A position Bpv in the vertical direction of the laser beam may be calculated from the expression: $Bp_V$=Bpv/M, based on the central position Bpv of the intensity profile in the vertical direction of the laser beam and the magnification M of the transfer optical system 1650.

The position $Bp_H$ in the horizontal direction of the laser beam may be calculated based on the center of gravity of the intensity profile in the horizontal direction of the laser beam and the magnification M of the transfer optical system 1650.

The position $Bp_V$ in the vertical direction of the laser beam may be calculated based on the center of gravity of the intensity profile in the vertical direction of the laser beam and the magnification M of the transfer optical system 1650.

FIG. 12 illustrates an example of a subroutine of the method of controlling the laser apparatus according to the first example embodiment of the disclosure.

The subroutine illustrated by way of example in FIG. 12 may be the subroutine (S1060) directed to the control, as illustrated by way of example in FIG. 7, of the divergence in the horizontal direction of the laser beam. In step S1061, the controller 1700 may calculate a difference $\Delta\theta_H$ between the target value $\theta_H t$ of the divergence in the horizontal direction of the laser beam and the measured value OH of the divergence in the horizontal direction of the laser beam. The controller 1700 may calculate the difference $\Delta\theta_H$ from the expression: $\Delta\theta_H=\theta_H-\theta_H t$.

In step S1062, the controller 1700 may so control the angle of posture of any reflection mirror, by which the divergence in the horizontal direction of the laser beam is changed, that the difference $\Delta\theta_H$ described above approaches 0 (zero). The reflection mirror that changes the divergence in the horizontal direction of the laser beam may be, for example, the rear mirror 1310 in the power oscillator 1300 as illustrated by way of example in FIG. 4A.

In step S1063, the controller 1700 may execute the subroutine (S1051) that measures the divergence of the laser beam and the pointing of the laser beam, as illustrated by way of example in FIG. 9.

In step S1064, the controller 1700 may make a determination as to whether the measured value $\theta_H$ of the divergence in the horizontal direction of the laser beam falls within the allowable range of the divergence in the horizontal direction of the laser beam. The controller 1700 may make a determination as to whether the measured value $\theta_H$ of the divergence in the horizontal direction of the laser beam satisfies the expression: $\theta_H \min \leq \theta_H \leq \theta_H \max$, where $\theta_H \min$ and $\theta_H \max$ may respectively be the minimum value and the maximum value of the allowable range of the divergence in the horizontal direction of the laser beam. The routine executed by the controller 1700 may return to the main routine when the measured value $\theta_H$ of the divergence in the horizontal direction of the laser beam satisfies the expression: $\theta_H \min \leq \theta_H \leq \theta_H \max$. The routine executed by the controller 1700 may return to the step S1061 when the measured value $\theta_H$ of the divergence in the horizontal direction of the laser beam fails to satisfy the expression: $\theta_H \min \leq \theta_H \leq \theta_H \max$.

FIG. 13 illustrates an example of a subroutine of the method of controlling the laser apparatus according to the first example embodiment of the disclosure.

The subroutine illustrated by way of example in FIG. 13 may be the subroutine (S1070) directed to the control, as illustrated by way of example in FIG. 7, of the divergence in the vertical direction of the laser beam.

In step S1071, the controller 1700 may calculate a difference $\Delta\theta_V$ between the target value $\theta_V t$ of the divergence in the vertical direction of the laser beam and the measured value $\theta_V$ of the divergence in the vertical direction of the laser beam. The controller 1700 may calculate the difference $\Delta\theta_V$ from the expression: $\Delta\theta_V=\theta_V-\theta_V t$.

In step S1072, the controller 1700 may so control the angle of posture of any reflection mirror, by which the divergence in the vertical direction of the laser beam is changed, that the difference $\Delta\theta_V$ described above approaches 0 (zero). The reflection mirror that changes the divergence in the vertical direction of the laser beam may be, for example, the fourth high-reflection concave mirror 1550 in the optical pulse stretcher 1500 as illustrated by way of example in FIG. 5A.

In step S1073, the controller 1700 may execute the subroutine (S1051) that measures the divergence of the laser beam and the pointing of the laser beam, as illustrated by way of example in FIG. 9.

In step S1074, the controller 1700 may make a determination as to whether the measured value $\theta_V$ of the divergence in the vertical direction of the laser beam falls within the allowable range of the divergence in the vertical direction of the laser beam. The controller 1700 may make a determination as to whether the measured value $\theta_V$ of the divergence in the vertical direction of the laser beam satisfies the expression: $\theta_V \min \leq \theta_V \leq \theta_V \max$, where $\theta_V \min$ and $\theta_V \max$ may respectively be the minimum value and the maximum value of the allowable range of the divergence in the vertical direction of the laser beam. The routine executed by the controller 1700 may return to the main routine when the measured value $\theta_V$ of the divergence in the vertical direction of the laser beam satisfies the expression: $\theta_V \min \leq v \leq \theta_V \max$. The routine executed by the controller 1700 may return to the step S1071 when the measured value $\theta_V$ of the divergence in the vertical direction of the laser beam fails to satisfy the expression: $\theta_V \min \leq \theta_V \leq \theta_V \max$.

FIG. 14 illustrates an example of a subroutine of the method of controlling the laser apparatus according to the first example embodiment of the disclosure.

The subroutine illustrated by way of example in FIG. 14 may be the subroutine (S1080) directed to the control, as illustrated by way of example in FIG. 7, of the pointing of the laser beam and the position of the laser beam.

In step S1081, the controller 1700 may calculate a difference $\Delta Po_H$ between the target value $Po_H t$ of the pointing in the horizontal direction of the laser beam and the measured value $Po_H$ of the pointing in the horizontal direction of the laser beam. The controller 1700 may calculate the difference $\Delta Po_H$ from the expression: $\Delta Po_H=PO_H-PO_H t$.

In step S1082, the controller 1700 may calculate a difference $\Delta Po_V$ between the target value Pot of the pointing in the vertical direction of the laser beam and the measured value $Po_V$ of the pointing in the vertical direction of the laser beam. The controller 1700 may calculate the difference $\Delta Po_V$ from the expression: $\Delta Po_V=Po_V-Po_V t$.

In step S1083, the controller 1700 may so control the angle of posture of any reflection mirror, by which the pointing in each of the horizontal direction and the vertical direction of the laser beam is changed, that the difference $\Delta Po_H$ and the difference $\Delta Po_V$ described above both approach 0 (zero). The reflection mirror that changes the pointing in each of the horizontal direction and the vertical direction of the laser beam may be, for example, the fourth high-reflection mirror 1420 in the power oscillator beam steering unit 1400 as illustrated by way of example in FIG. 6.

In step S1084, the controller 1700 may execute the subroutine (S1051) that measures the characteristics of the laser beam as illustrated by way of example in FIG. 9.

In step S1085, the controller 1700 may make a determination as to whether the measured values $Po_H$ and $Po_V$ of the pointings in the horizontal and the vertical directions of the laser beam fall within the respective allowable ranges of the pointings in the horizontal and the vertical directions of the laser beam. The controller 1700 may make a determination as to whether the measured values $Po_H$ and $Po_V$ of the pointings in the horizontal and the vertical directions of the laser beam satisfy their respective expressions: $Po_H \min \leq Po_H \leq Po_H \max$ and $Po_V \min \leq Po_V \leq Po_V \max$. $Po_H \min$ and $Po_H \max$ may respectively be the minimum value and the maximum value of the allowable range of the pointing in the horizontal direction of the laser beam. $Po_V \min$ and $Po_V \max$ may respectively be the minimum value and the maximum value of the allowable range of the pointing in the vertical direction of the laser beam. The routine executed by the controller 1700 may proceed to step S1086 when the measured values $Po_H$ and $Po_V$ of the pointings in the horizontal and the vertical directions of the laser beam satisfy their respective expressions: $Po_H\text{min} \leq Po_H \leq Po_H\text{max}$ and $Po_V\text{min} \leq Po_V \leq Po_V\text{max}$. The routine executed by the controller 1700 may return to the step S1081 when the measured values $Po_H$ and $Po_V$ of the pointings in the horizontal and the vertical directions of the laser beam fail to satisfy their respective expressions: $Po_H\text{min} \leq Po_H \leq Po_H\text{max}$ and $Po_V\text{min} \leq Po_V \leq Po_V\text{max}$.

In step S1086, the controller 1700 may calculate a difference $\Delta Bp_H$ between the target value $Bp_H t$ of the position in the horizontal direction of the laser beam and the measured value $Bp_H$ of the position in the horizontal direction of the laser beam. The controller 1700 may calculate the difference $\Delta Bp_H$ from the expression: $\Delta Bp_H = Bp_H - Bp_H t$.

In step S1087, the controller 1700 may calculate a difference $\Delta Bp_V$ between the target value $Bp_V t$ of the position in the vertical direction of the laser beam and the measured value $Bpv$ of the position in the vertical direction of the laser beam. The controller 1700 may calculate the difference $\Delta Bp_V$ from the expression: $\Delta Bp_V = Bp_V - Bp_V t$.

In step S1088, the controller 1700 may so control the angle of posture of any reflection mirror, by which the position in each of the horizontal direction and the vertical direction of the laser beam is changed, that the difference $\Delta Bp_H$ and the difference $\Delta Bp_V$ described above both approach 0 (zero). The reflection mirror that changes the position in each of the horizontal direction and the vertical direction of the laser beam may be, for example, the third high-reflection mirror 1410 in the power oscillator beam steering unit 1400 as illustrated by way of example in FIG. 6.

In step S1089, the controller 1700 may execute the subroutine (S1051) that measures the characteristics of the laser beam as illustrated by way of example in FIG. 9.

In step S1090, the controller 1700 may make a determination as to whether the measured values $Bp_H$ and $Bp_V$ of the positions in the horizontal and the vertical directions of the laser beam fall within the respective allowable ranges of the positions in the horizontal and the vertical directions of the laser beam. The controller 1700 may make a determination as to whether the measured values $Bp_H$ and $Bp_V$ of the positions in the horizontal and the vertical directions of the laser beam satisfy their respective expressions: $Bp_H\text{min} \leq Bp_H \leq Bp_H\text{max}$ and $Bp_V\text{min} \leq Bp_V \leq Bp_V\text{max}$. $Bp_H\text{min}$ and $Bp_H\text{max}$ may respectively be the minimum value and the maximum value of the allowable range of the position in the horizontal direction of the laser beam. $Bp_V\text{min}$ and $Bp_V\text{max}$ may respectively be the minimum value and the maximum value of the allowable range of the position in the vertical direction of the laser beam. The routine executed by the controller 1700 may proceed to step S1091 when the measured values $Bp_H$ and $Bp_V$ of the positions in the horizontal and the vertical directions of the laser beam satisfy their respective expressions: $Bp_H\text{min} \leq Bp_H \leq Bp_H\text{max}$ and $Bp_V\text{min} \leq Bp_V \leq Bp_V\text{max}$. The routine executed by the controller 1700 may return to the step S1086 when the measured values $Bp_H$ and $Bpv$ of the positions in the horizontal and the vertical directions of the laser beam fail to satisfy their respective expressions: $Bp_H\text{min} \leq Bp_H - Bp_H\text{max}$ and $Bp_V\text{min} \leq Bp_V \leq Bp_V\text{max}$.

In step S1091, the controller 1700 may make the determination again as to whether the measured values $PO_H$ and $Po_V$ of the pointings in the horizontal and the vertical directions of the laser beam fall within the respective allowable ranges of the pointings in the horizontal and the vertical directions of the laser beam. The controller 1700 may make the determination again as to whether the measured values $Po_H$ and $Po_V$ of the pointings in the horizontal and the vertical directions of the laser beam satisfy their respective expressions: $Po_H\text{min} \leq Po_H \leq Po_H\text{max}$ and $Po_V\text{min} \leq Po_V \leq Po_V\text{max}$. The routine executed by the controller 1700 may return to the main routine when the measured values $Po_H$ and $Po_V$ of the pointings in the horizontal and the vertical directions of the laser beam satisfy their respective expressions: $Po_H\text{min} \leq Po_H \leq Po_H\text{max}$ and $Po_V\text{min} \leq Po_V \leq Po_V\text{max}$. The controller 1700 may repeat the step S1081 when the measured values PoH and Pov of the pointings in the horizontal and the vertical directions of the laser beam fail to satisfy their respective expressions: $Po_H\text{min} \leq Po_H \leq Po_H\text{max}$ and $Po_V\text{min} \leq Po_V \leq Po_V\text{max}$.

The first example embodiment of the disclosure is not limited to an example in which the divergence in the horizontal direction and the divergence in the vertical direction of the laser beam are respectively controlled based on the angle of posture of the rear mirror 1310 in the power oscillator 1300 and the fourth high-reflection concave mirror 1550 in the optical pulse stretcher 1500. The divergence in the horizontal direction and the divergence in the vertical direction of the laser beam may respectively be controlled based on an angle of posture of any reflection mirror provided in the optical pulse stretcher 1500 and an angle of posture of any reflection mirror provided in the power oscillator 1300. Any reflection mirror provided in the optical pulse stretcher 1500 may be, for example, the fourth high-reflection concave mirror 1550. Any reflection mirror provided in the power oscillator 1300 may be, for example, the rear mirror 1310.

[3. Laser Apparatus According to Second Example Embodiment of Disclosure]

Figure 15A:
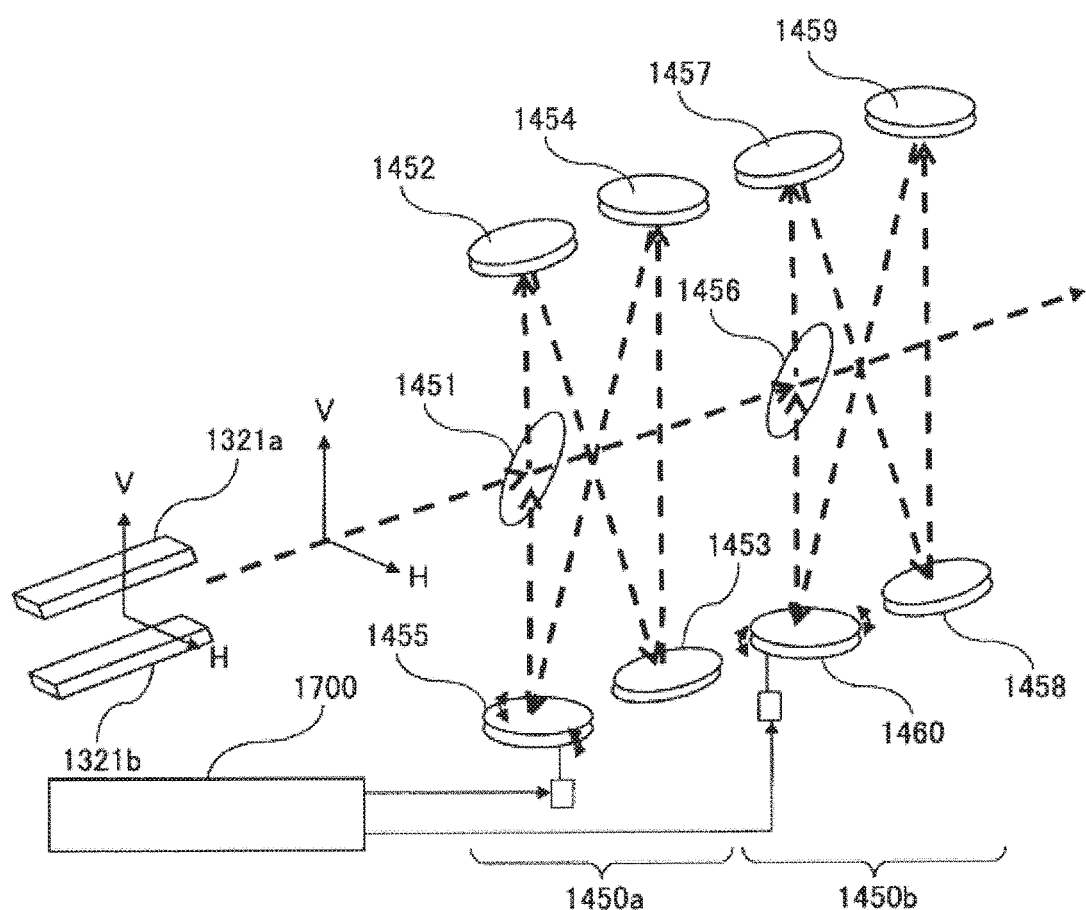
FIG. 15A illustrates an example of an operation of controlling mirrors in two optical pulse stretchers provided in a laser apparatus according to a second example embodiment of the disclosure.
Figure 15B:
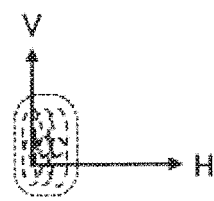
FIG. 15B illustrates an example of an effect of controlling the mirrors in the two optical pulse stretchers provided in the laser apparatus according to the second example embodiment of the disclosure.

FIG. 15A illustrates an example of an operation of controlling mirrors in two optical pulse stretchers provided in a laser apparatus according to a second example embodiment of the disclosure. FIG. 15B illustrates an example of an effect of controlling the mirrors in the two optical pulse stretchers provided in the laser apparatus according to the second example embodiment of the disclosure.

The laser apparatus according to the second example embodiment of the disclosure may include a configuration in which the single optical pulse stretcher 1500 in the laser apparatus 1000 according to the first example embodiment is modified to include two optical pulse stretchers 1450a and 1450b as illustrated by way of example in FIG. 15A.

The laser apparatus according to the second example embodiment of the disclosure may include the first optical pulse stretcher 1450a and the second optical pulse stretcher 1450b.

The first optical pulse stretcher 1450a may include a first beam splitter 1451, a first high-reflection concave mirror 1452, a second high-reflection concave mirror 1453, a third high-reflection concave mirror 1454, and a fourth high-reflection concave mirror 1455. One or more of the first high-reflection concave mirror 1452, the second high-reflection concave mirror 1453, the third high-reflection concave mirror 1454, and the fourth high-reflection concave mirror 1455 may be held by an actuator mirror holder that may be controlled by the controller 1700. For example, the first high-reflection concave mirror 1452, the second high-reflection concave mirror 1453, and the third high-reflection concave mirror 1454 each may be held by a mirror holder, whereas the fourth high-reflection concave mirror 1455 may be held by the actuator mirror holder. The actuator mirror holder that may hold the fourth high-reflection concave mirror 1455 may be so controlled by the controller 1700 as to change an angle of posture of the fourth high-reflection concave mirror 1455 in the horizontal direction H, for example.

The second optical pulse stretcher 1450b may include a second beam splitter 1456, a fifth high-reflection concave mirror 1457, a sixth high-reflection concave mirror 1458, a seventh high-reflection concave mirror 1459, and an eighth high-reflection concave mirror 1460. One or more of the fifth high-reflection concave mirror 1457, the sixth high-reflection concave mirror 1458, the seventh high-reflection concave mirror 1459, and the eighth high-reflection concave mirror 1460 may be held by an actuator mirror holder that may be controlled by the controller 1700. For example, the fifth high-reflection concave mirror 1457, the sixth high-reflection concave mirror 1458, and the seventh high-reflection concave mirror 1459 each may be held by a mirror holder, whereas the eighth high-reflection concave mirror 1460 may be held by the actuator mirror holder. The actuator mirror holder that may hold the eighth high-reflection concave mirror 1460 may be so controlled by the controller 1700 as to change an angle of posture of the eighth high-reflection concave mirror 1460 in the vertical direction V, for example.

A part of the laser beam that has entered the first beam splitter 1451 may pass through the first beam splitter 1451, whereas another part of the laser beam that has entered the first beam splitter 1451 may be reflected from the first beam splitter 1451. The laser beam reflected from the first beam splitter 1451 may be reflected from the first high-reflection concave mirror 1452, the second high-reflection concave mirror 1453, the third high-reflection concave mirror 1454, and the fourth high-reflection concave mirror 1455 to enter the first beam splitter 1451 again. A part of the laser beam that has entered the first beam splitter 1451 again may be outputted from the first optical pulse stretcher 1450a to enter the second beam splitter 1456. The controller 1700 may change the angle of posture of the fourth high-reflection concave mirror 1455 in the horizontal direction H. The laser beam to be outputted from the first optical pulse stretcher 1450a may be shifted in the horizontal direction by changing the angle of posture of the fourth high-reflection concave mirror 1455 in the horizontal direction H as illustrated by way of example in FIG. 15A.

A part of the laser beam that has entered the second beam splitter 1456 may pass through the second beam splitter 1456, whereas another part of the laser beam that has entered the second beam splitter 1456 may be reflected from the second beam splitter 1456. The laser beam reflected from the second beam splitter 1456 may be reflected from the fifth high-reflection concave mirror 1457, the sixth high-reflection concave mirror 1458, the seventh high-reflection concave mirror 1459, and the eighth high-reflection concave mirror 1460 to enter the second beam splitter 1456 again. A part of the laser beam that has entered the second beam splitter 1456 again may be outputted from the second optical pulse stretcher 1450b. The controller 1700 may change the angle of posture of the eighth high-reflection concave mirror 1460 in the vertical direction V. The laser beam to be outputted from the second optical pulse stretcher 1450b may be shifted in the vertical direction by changing the angle of posture of the eighth high-reflection concave mirror 1460 in the vertical direction V as illustrated by way of example in FIG. 15A.

Referring by way of example to FIG. 15B, the divergence in the horizontal direction H of the laser beam to be outputted from the second optical pulse stretcher 1450b may be changed by changing the angle of posture of the fourth high-reflection concave mirror 1455 in the horizontal direction H as illustrated by way of example in FIG. 15A. As illustrated by way of example in FIG. 15B, the divergence in the vertical direction V of the laser beam to be outputted from the second optical pulse stretcher 1450b may be changed by changing the angle of posture of the eighth high-reflection concave mirror 1460 in the vertical direction V as illustrated by way of example in FIG. 15A.

In the laser apparatus according to the second example embodiment of the disclosure, the rear mirror 1310 provided in the power oscillator 1300 in the laser apparatus 1000 according to the first example embodiment of the disclosure may be held by a mirror holder that does not include an actuator.

In the laser apparatus according to the second example embodiment of the disclosure, the divergence in each of the horizontal and the vertical directions of the laser beam may be controlled without involving control of both the angle of posture of the rear mirror 1310 and the angle of posture of the second output coupler mirror 1330.

Three or more optical pulse stretchers may be provided in the laser apparatus according to the second example embodiment of the disclosure. In each of the two optical pulse stretchers among the three or more optical pulse stretchers, one of the high-reflection concave mirrors may be held by an actuator mirror holder. The angle of posture of each of the two high-reflection concave mirrors, provided in the two optical pulse stretchers and each held by the actuator mirror holder, may be changed to thereby control, for example, the divergence in each of the horizontal and the vertical directions of the laser beam,

[4. Laser Apparatus According to Third Example Embodiment of Disclosure]

Figure 16:
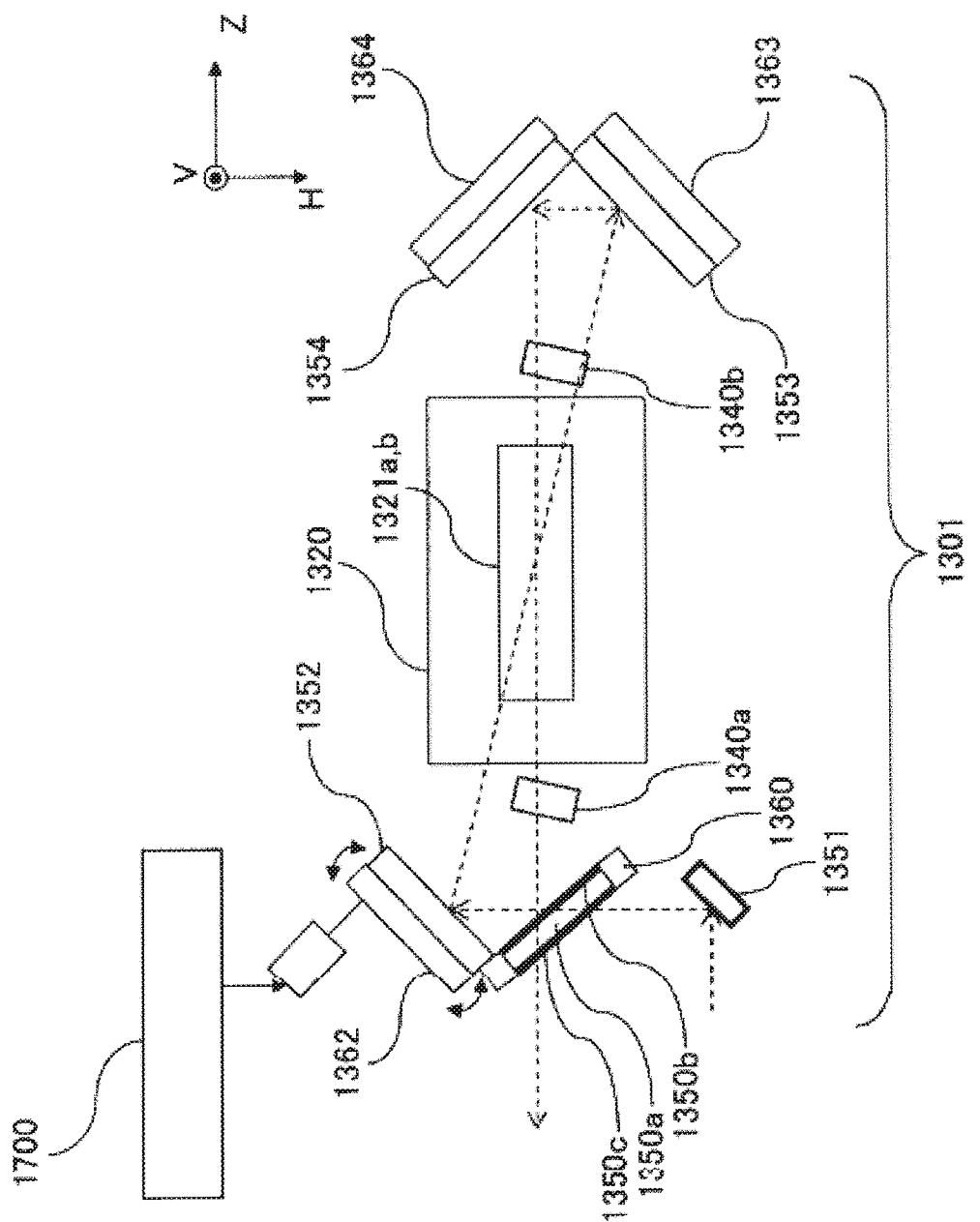
FIG. 16 illustrates an example of an operation of controlling a mirror in a power oscillator resonator provided in a laser apparatus according to a third example embodiment of the disclosure.

FIG. 16 illustrates an example of an operation of controlling a mirror in a power oscillator resonator provided in a laser apparatus according to a third example embodiment of the disclosure.

The laser apparatus according to the third example embodiment of the disclosure may include a power oscillator 1301 that includes a ring resonator as illustrated by way of example in FIG. 16, instead of the power oscillator 1300 that includes the Fabry-Perot resonator as illustrated by way of example in FIG. 4A.

The power oscillator 1301 may include the second chamber 1320, the two discharge electrodes 1321a and 1321b, the two windows 1340a and 1340b, an output coupler mirror 1350a, a fifth high-reflection mirror 1351, a sixth high-reflection mirror 1352, a seventh high-reflection mirror 1353, and an eighth high-reflection mirror 1354. The output coupler mirror 1350a may include a first surface that is provided with a coating that allows for partial transmission, i.e., a partial transmission coating 1350b. The output coupler mirror 1350a may include a second surface that is provided with a coating that prevents reflection, i.e., a reflection preventing coating 1350c. The output coupler mirror 1350a provided with the partial transmission coating 1350b and the reflection preventing coating 1350c may be held by an output coupler mirror holder 1360. The sixth high-reflection mirror 1352 may be held by an actuator mirror holder 1362 that may be controlled by the controller 1700. The seventh high-reflection mirror 1353 may be held by a mirror holder 1363. The eighth high-reflection mirror 1354 may be held by a mirror holder 1364. The seventh high-reflection mirror 1353, the eighth high-reflection mirror 1354, and the output coupler mirror 1350a provided with the partial transmission coating 1350b and the reflection preventing coating 1350c may form the ring resonator.

In the power oscillator 1301, the laser beam that enters the fifth high-reflection mirror 1351 may be reflected from the fifth high-reflection mirror 1351. The laser beam reflected from the fifth high-reflection mirror 1351 may pass through the reflection preventing coating 1350c, the output coupler mirror 1350a, and the partial transmission coating 1350b to enter the sixth high-reflection mirror 1352. The laser beam that has entered the sixth high-reflection mirror 1352 may be reflected from the sixth high-reflection mirror 1352, the seventh high-reflection mirror 1353, and the eighth high-reflection mirror 1354. The laser beam reflected from the eighth high-reflection mirror 1354 may pass through the window 1340b, the second chamber 1320, and the window 1340a to be subjected to amplification. A part of the amplified laser beam may pass through the output coupler mirror 1350a provided with the partial transmission coating 1350b and the reflection preventing coating 1350c to be outputted from the power oscillator 1301.

The laser beam to be outputted from the power oscillator 1301 may be shifted, for example, in the horizontal direction H by changing an angle of posture of the sixth high-reflection mirror 1352 in the horizontal direction H as illustrated by way of example in FIG. 16. The divergence of the laser beam to be outputted from the power oscillator 1301 may be changed in the horizontal direction H by changing the angle of posture of the sixth high-reflection mirror 1352 in the horizontal direction H, for example.

The laser beam to be outputted from the power oscillator 1301 may be shifted, for example, in the vertical direction V by changing the angle of posture of the sixth high-reflection mirror 1352 in the vertical direction V. The divergence of the laser beam to be outputted from the power oscillator 1301 may be changed in the vertical direction V by changing the angle of posture of the sixth high-reflection mirror 1352 in the vertical direction V, for example.

One or more of the reflection mirrors that form the ring resonator in the power oscillator 1301 may be held by the actuator mirror holder to change an angle of posture of the one or more of the reflection mirrors. In the laser apparatus according to the third example embodiment, one of the seventh high-reflection mirror 1353 and the eighth high-reflection mirror 1354 may be held by the actuator mirror holder to change an angle of posture of the one of those high-reflection mirrors instead of the sixth high-reflection mirror 1352.

In the laser apparatus according to the third example embodiment, two or more of the sixth high-reflection mirror 1352, the seventh high-reflection mirror 1353, and the eighth high-reflection mirror 1354 each may be retained by the actuator mirror holder to change an angle of posture of each of the two or more of those high-reflection mirrors.

[5. Laser Apparatus According to Fourth Example Embodiment of Disclosure]

Figure 17:
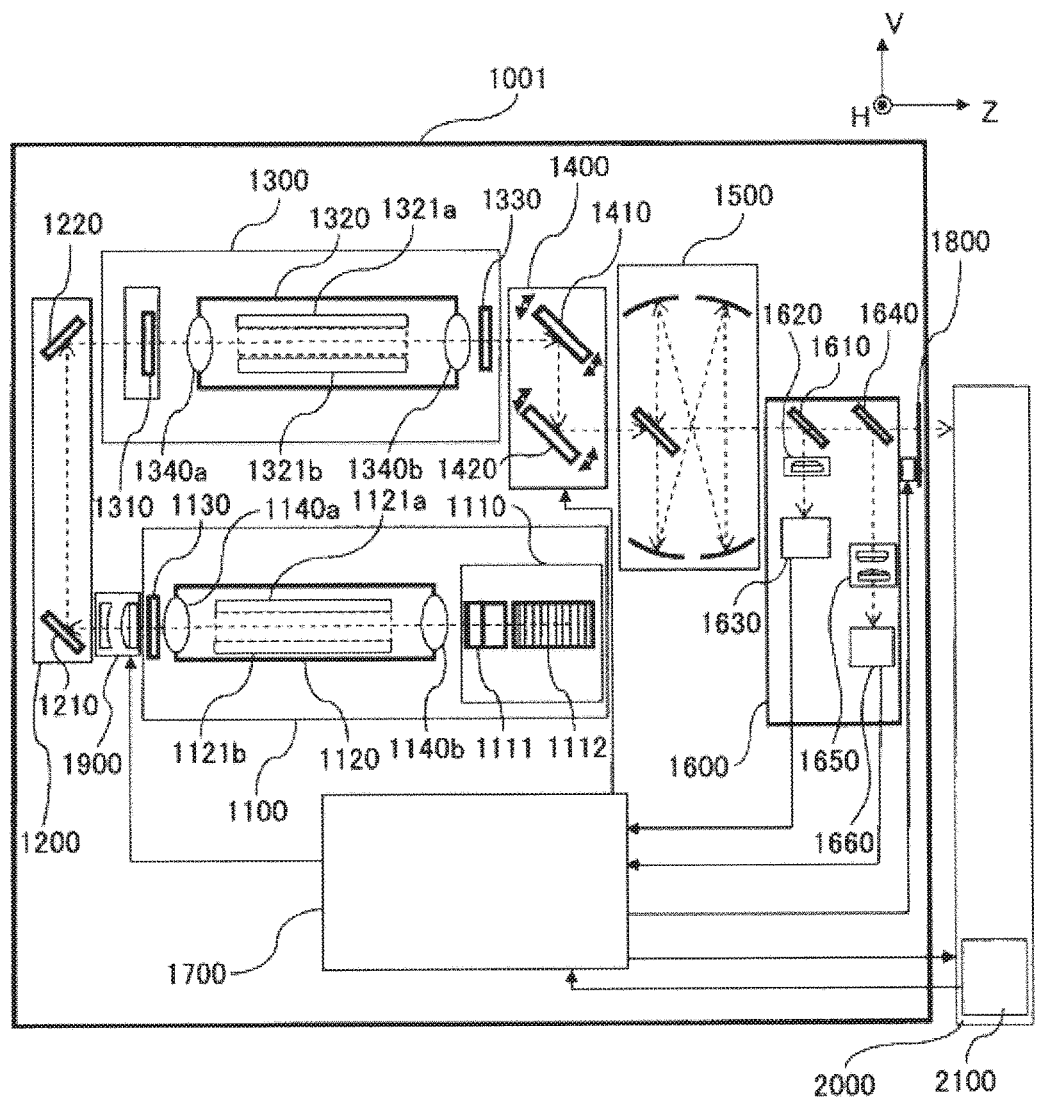
FIG. 17 illustrates an example of an overall configuration of a laser apparatus according to a fourth example embodiment of the disclosure.

FIG. 17 illustrates an example of an overall configuration of a laser apparatus according to a fourth example embodiment of the disclosure. Note that elements in the laser apparatus illustrated by way of example in FIG. 17 which are the same as or similar to the elements in the laser apparatus illustrated by way of example in FIG. 1 are denoted with the same reference numerals, and any redundant description on each of such elements is omitted.

A laser apparatus 1001 according to the fourth example embodiment of the disclosure as illustrated by way of example in FIG. 17 may include a beam divergence controller 1900. The beam divergence controller 1900 may control the divergence of the laser beam to be outputted from the laser apparatus 1001. For example, the beam divergence controller 1900 may control the divergence in each of the horizontal direction H and the vertical direction V of the laser beam to be outputted from the laser apparatus 1001.

The beam divergence controller 1900 may be provided in an optical path between the master oscillator 1100 and the power oscillator 1300. For example, the beam divergence controller 1900 may be provided between the first output coupler mirror 1130 provided in the master oscillator 1100 and the first high-reflection mirror 1210 provided in the master oscillator beam steering unit 1200.

In the laser apparatus 1001, the rear mirror 1310 provided in the power oscillator 1300 may be held by a mirror holder that does not include an actuator. In the laser apparatus 1001, the divergence of the laser beam may be controlled by the beam divergence controller 1900, without involving control of both the angle of posture of the rear mirror 1310 and the angle of posture of the second output coupler mirror 1330.

In the laser apparatus 1001, the fourth high-reflection concave mirror 1550 provided in the optical pulse stretcher 1500 may be held by a mirror holder that does not include an actuator. In the laser apparatus 1001, the divergence of the laser beam may be controlled by the beam divergence controller 1900, without involving control of the angle of posture of any of the four high-reflection concave mirrors provided in the optical pulse stretcher 1500.

Figure 18A:
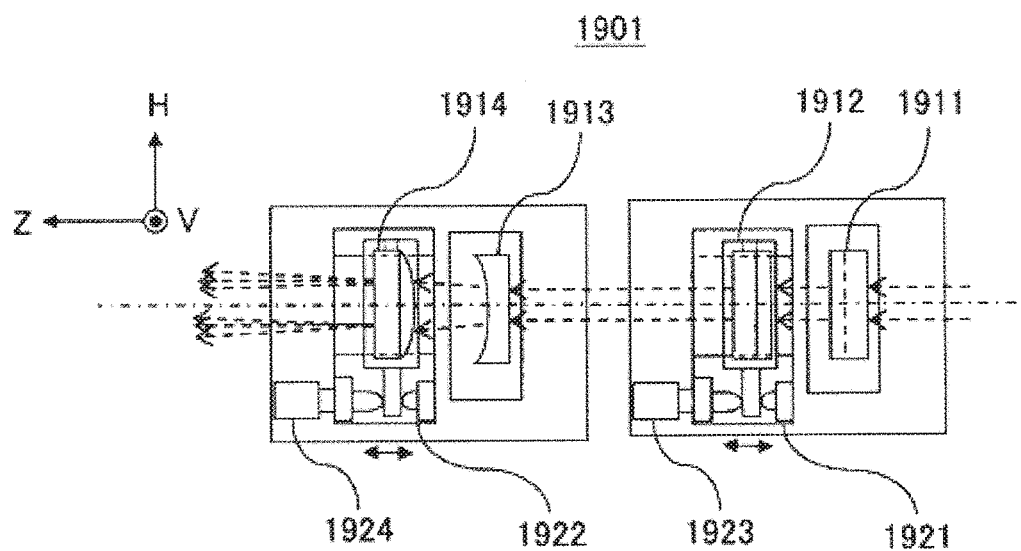
FIG. 18A is a top view of a first example of a beam divergence controller provided in the laser apparatus according to the fourth example embodiment of the disclosure.
Figure 18B:
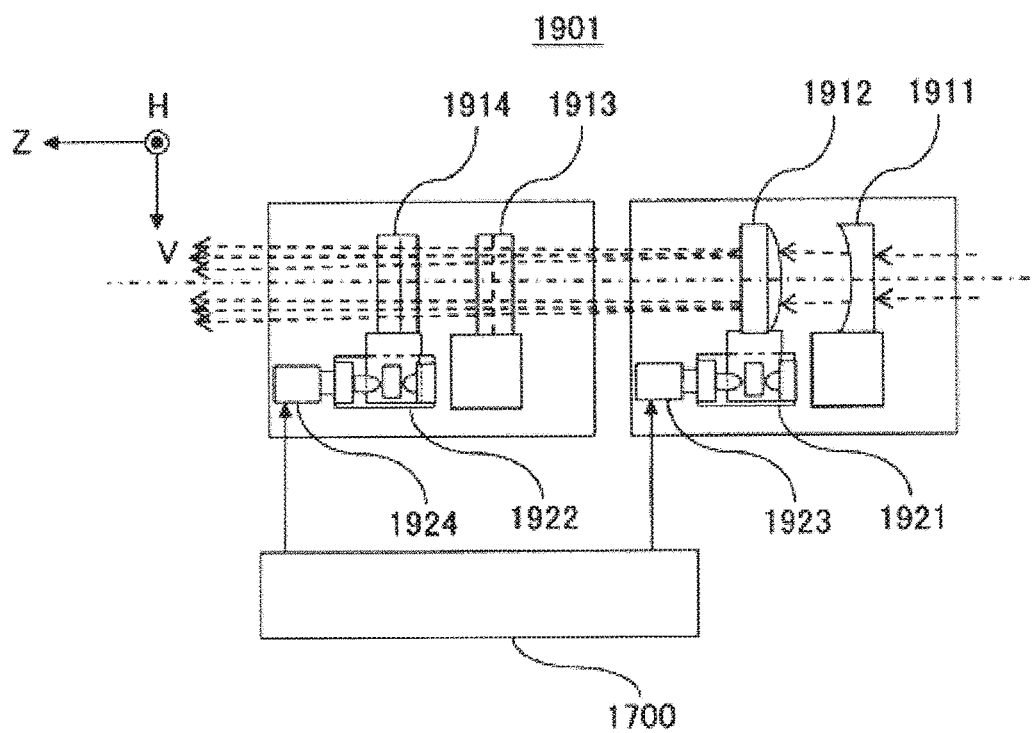
FIG. 18B is a side view of the first example of the beam divergence controller provided in the laser apparatus according to the fourth example embodiment of the disclosure.

FIG. 18A is a top view of a first example of the beam divergence controller provided in the laser apparatus according to the fourth example embodiment of the disclosure. FIG. 18B is a side view of the first example of the beam divergence controller provided in the laser apparatus according to the fourth example embodiment of the disclosure.

A beam divergence controller 1901 illustrated by way of example in FIGS. 18A and 18B may be so controlled by the controller 1700 as to control the divergence in each of the horizontal direction H and the vertical direction V of the laser beam.

The beam divergence controller 1901 may include a first cylindrical concave lens 1911, a first cylindrical convex lens 1912, a second cylindrical concave lens 1913, and a second cylindrical convex lens 1914. The beam divergence controller 1901 may include a first linear stage 1921 and a second linear stage 1922. The first linear stage 1921 may include a first automatic micrometer 1923. The second linear stage 1922 may include a second automatic micrometer 19241. The first automatic micrometer 1923 and the second automatic micrometer 1924 may be controlled by the controller 1700.

The first cylindrical concave lens 1911, the first cylindrical convex lens 1912, the second cylindrical concave lens 1913, and the second cylindrical convex lens 1914 may be disposed in order in an optical path of the laser beam.

A direction of a line focus of the first cylindrical concave lens 1911 and a direction of a line focus of the first cylindrical convex lens 1912 may be substantially the same as each other. The direction of the line focus of the first cylindrical concave lens 1911 and the direction of the line focus of the first cylindrical convex lens 1912 each may be substantially the same as the horizontal direction H.

A direction of a line focus of the second cylindrical concave lens 1913 and a direction of a line focus of the second cylindrical convex lens 1914 may be substantially the same as each other. The direction of the line focus of the second cylindrical concave lens 1913 and the direction of the line focus of the second cylindrical convex lens 1914 each may be substantially the same as the vertical direction V.

The first cylindrical convex lens 1912 may be disposed on the first linear stage 1921 that includes the first automatic micrometer 1923. An interval between the first cylindrical concave lens 1911 and the first cylindrical convex lens 1912 in the traveling direction Z of the laser beam may be adjusted by the first linear stage 1921 that includes the first automatic micrometer 1923.

The second cylindrical convex lens 1914 may be disposed on the second linear stage 1922 that includes the second automatic micrometer 1924. An interval between the second cylindrical concave lens 1913 and the second cylindrical convex lens 1914 in the traveling direction Z of the laser beam may be adjusted by the second linear stage 1922 that includes the second automatic micrometer 1924.

The interval between the first cylindrical concave lens 1911 and the first cylindrical convex lens 1912 may be changed to thereby change the divergence in the vertical direction V of the laser beam that passes through the beam divergence controller 1901. Thus, the divergence in the vertical direction V of the laser beam to be outputted from the laser apparatus 1001 may be changed.

The interval between the second cylindrical concave lens 1913 and the second cylindrical convex lens 1914 may be changed to thereby change the divergence in the horizontal direction H of the laser beam that passes through the beam divergence controller 1901. Thus, the divergence in the horizontal direction H of the laser beam to be outputted from the laser apparatus 1001 may be changed.

Two pairs of lenses each including a combination of the cylindrical concave lens and the cylindrical convex lens may be used to independently change the divergence in the horizontal direction H and the divergence in the vertical direction V of the laser beam that passes through the beam divergence controller 1901. Thus, the divergence in the horizontal direction H and the divergence in the vertical direction V of the laser beam to be outputted from the laser apparatus 1001 may be changed independently. The beam divergence controller 1901 may be used to change the divergence in each of the horizontal direction H and the vertical direction V of the laser beam, without involving the control of the angle of posture of any reflection mirror provided in the power oscillator 1300. The beam divergence controller 1901 may be used to change the divergence in each of the horizontal direction H and the vertical direction V of the laser beam, without involving the control of the angle of posture of any reflection mirror provided in the optical pulse stretcher 1500.

The beam divergence controller 1901 may change only one of the divergence in the horizontal direction H and the divergence in the vertical direction V of the laser beam. The angle of posture of any reflection mirror provided in the power oscillator 1300 or the optical pulse stretcher 1500 may be controlled to change the other of the divergence in the horizontal direction H and the divergence in the vertical direction V of the laser beam.

Figure 19A:
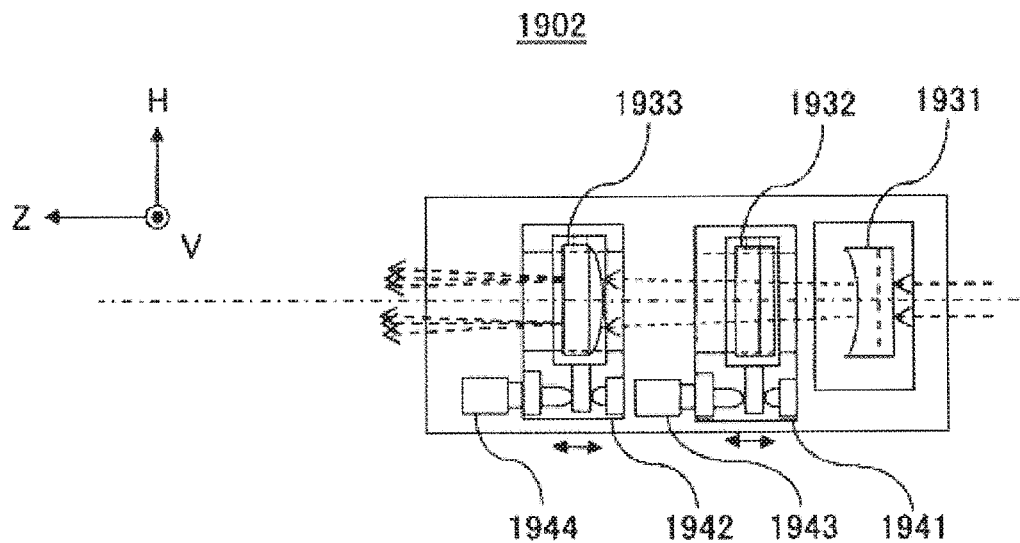
FIG. 19A is a top view of a second example of the beam divergence controller provided in the laser apparatus according to the fourth example embodiment of the disclosure.
Figure 19B:
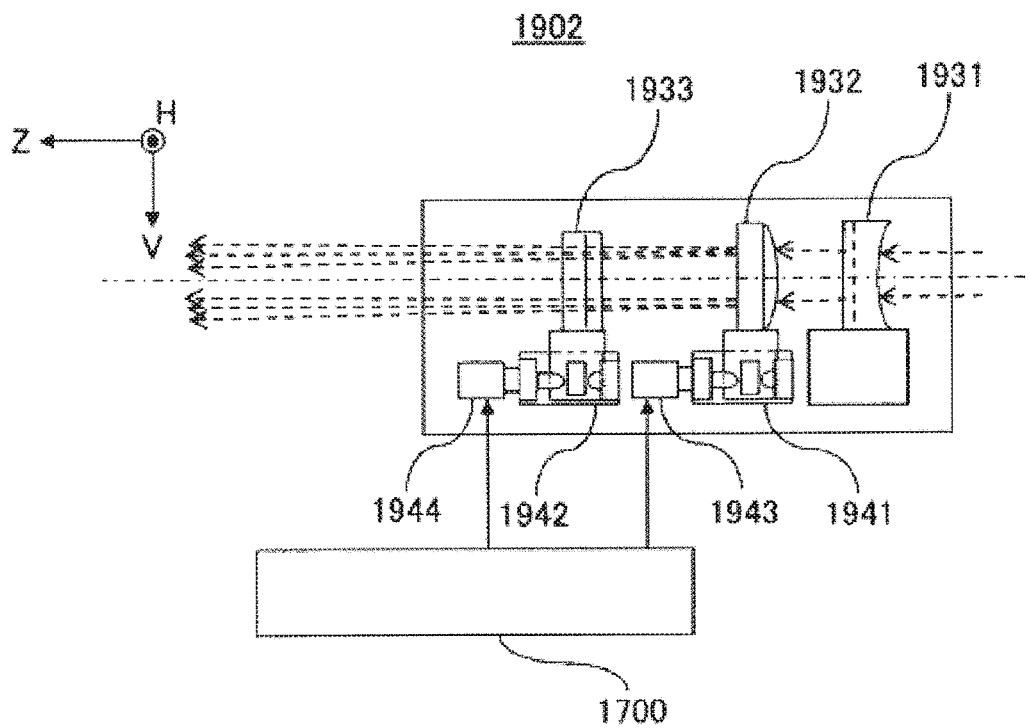
FIG. 19B is a side view of the second example of the beam divergence controller provided in the laser apparatus according to the fourth example embodiment of the disclosure.

FIG. 19A is a top view of a second example of the beam divergence controller provided in the laser apparatus according to the fourth example embodiment of the disclosure. FIG. 19B is a side view of the second example of the beam divergence controller provided in the laser apparatus according to the fourth example embodiment of the disclosure.

A beam divergence controller 1902 illustrated by way of example in FIGS. 19A and 19B may be so controlled by the controller 1700 as to control the divergence in each of the horizontal direction H and the vertical direction V of the laser beam.

The beam divergence controller 1902 may include a double-sided cylindrical concave lens 1931, a first cylindrical convex lens 1932, and a second cylindrical convex lens 1933. The beam divergence controller 1902 may include a first linear stage 1941 and a second linear stage 1942. The first linear stage 1941 may include a first automatic micrometer 1943. The second linear stage 1942 may include a second automatic micrometer 1944.

The first automatic micrometer 1943 and the second automatic micrometer 1944 may be controlled by the controller 1700.

The double-sided cylindrical concave lens 1931, the first cylindrical convex lens 1932, and the second cylindrical convex lens 1933 may be disposed in order in an optical path of the laser beam.

Directions of two line focuses of the double-sided cylindrical concave lens 1931 may be substantially the same as the respective horizontal direction H and vertical direction V.

A direction of a line focus of the first cylindrical convex lens 1932 may be substantially the same as one of the directions of the line focuses of the double-sided cylindrical concave lens 1931. For example, the direction of the line focus of the first cylindrical convex lens 1932 may be substantially the same as the horizontal direction H.

A direction of a line focus of the second cylindrical convex lens 1933 may be substantially the same as the other of the directions of the line focuses of the double-sided cylindrical concave lens 1931. For example, the direction of the line focus of the second cylindrical convex lens 1933 may be substantially the same as the vertical direction V.

The first cylindrical convex lens 1932 may be disposed on the first linear stage 1941 that includes the first automatic micrometer 1943. An interval between the double-sided cylindrical concave lens 1931 and the first cylindrical convex lens 1932 in the traveling direction Z of the laser beam may be adjusted by the first linear stage 1941 that includes the first automatic micrometer 1943.

The second cylindrical convex lens 1933 may be disposed on the second linear stage 1942 that includes the second automatic micrometer 1944. An interval between the double-sided cylindrical concave lens 1931 and the second cylindrical convex lens 1933 in the traveling direction Z of the laser beam may be adjusted by the second linear stage 1942 that includes the second automatic micrometer 1944.

The interval between the double-sided cylindrical concave lens 1931 and the first cylindrical convex lens 1932 may be changed to thereby change the divergence in the vertical direction V of the laser beam that passes through the beam divergence controller 1902. Thus, the divergence in the vertical direction V of the laser beam to be outputted from the laser apparatus 1001 may be changed.

The interval between the double-sided cylindrical concave lens 1931 and the second cylindrical convex lens 1933 may be changed to thereby change the divergence in the horizontal direction H of the laser beam that passes through the beam divergence controller 1902. Thus, the divergence in the horizontal direction H of the laser beam to be outputted from the laser apparatus 1001 may be changed.

The double-sided cylindrical concave lens and the two cylindrical convex lenses may be used in combinations to independently change the divergence in each of the horizontal direction H and the vertical direction V of the laser beam that passes through the beam divergence controller 1902. Thus, the divergence in the horizontal direction H and the divergence in the vertical direction V of the laser beam to be outputted from the laser apparatus 1001 may be changed independently. The beam divergence controller 1902 may be used to change the divergence in each of the horizontal direction H and the vertical direction V of the laser beam, without involving the control of the angle of posture of any reflection mirror provided in the power oscillator 1300. The beam divergence controller 1902 may be used to change the divergence in each of the horizontal direction H and the vertical direction V of the laser beam, without involving the control of the angle of posture of any reflection mirror provided in the optical pulse stretcher 1500.

The number of optical elements provided in the beam divergence controller 1902 as illustrated by way of example in FIGS. 19A and 19B may be less than the number of optical elements provided in the beam divergence controller 1901 as illustrated by way of example in FIGS. 18A and 18B.

The beam divergence controller 1902 may change only one of the divergence in the horizontal direction H and the divergence in the vertical direction V of the laser beam. The angle of posture of any reflection mirror provided in the power oscillator 1300 or the optical pulse stretcher 1500 may be controlled to change the other of the divergence in the horizontal direction H and the divergence in the vertical direction V of the laser beam.

[6. Other Elements]

[6.1 Actuator Mirror Holder]

Figure 20:
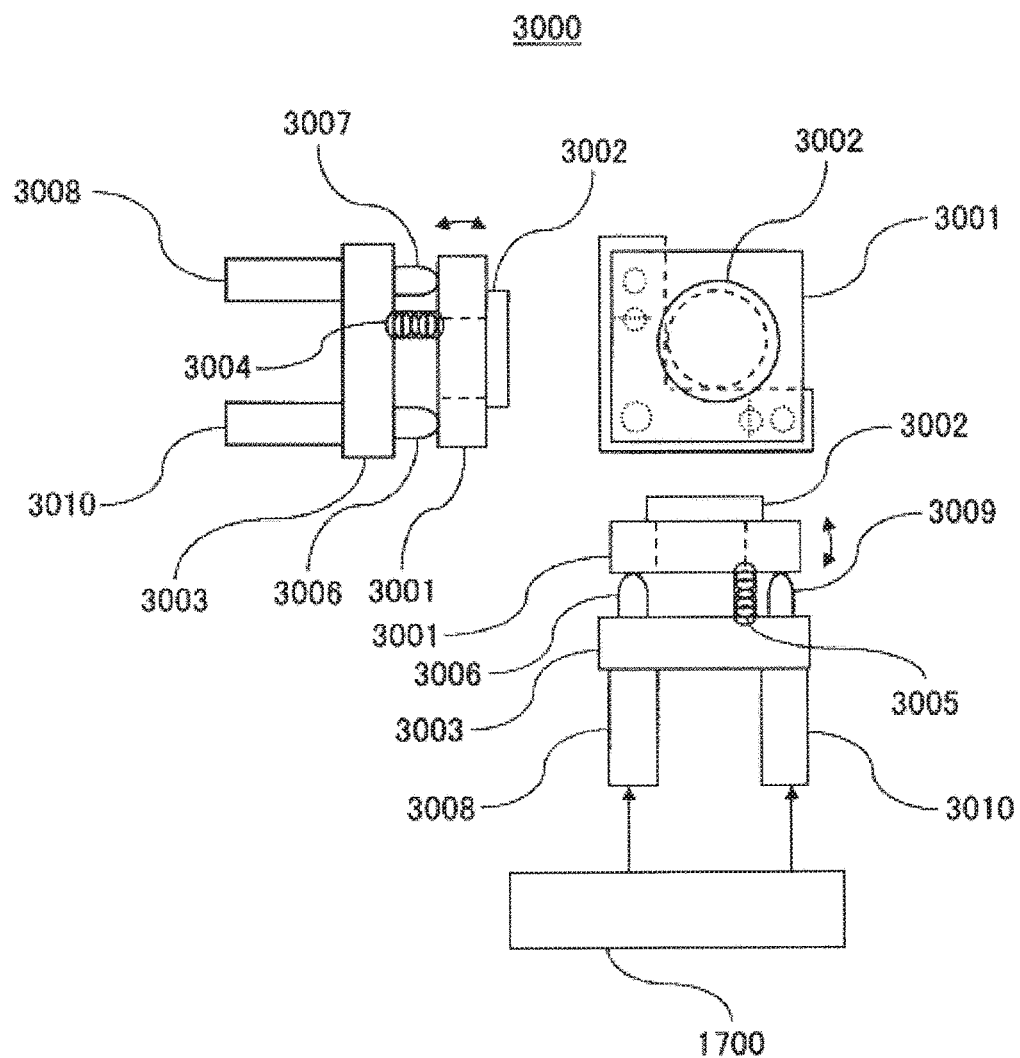
FIG. 20 illustrates an example of an actuator mirror holder according to any of the example embodiments of the disclosure.

FIG. 20 illustrates an example of an actuator mirror holder according to any of the example embodiments of the disclosure.

An actuator mirror holder 3000 illustrated by way of example in FIG. 20 may be a mirror holder that includes a biaxial gimbal mechanism.

The actuator mirror holder 3000 may include a plate 3001, a mirror holding section 3002, an L-shaped plate 3003, a first tension spring 3004, a second tension spring 3005, a support 3006, a first movable pin 3007, a first automatic micrometer 3008, a second movable pin 3009, and a second automatic micrometer 3010.

A reflection mirror used in the laser apparatus according to any of the example embodiments of the disclosure may be provided on the mirror holding section 3002. The mirror holding section 3002 may be provided on the plate 3001. The plate 3001 and the L-shaped plate 3003 may be supported by the support 3006, the first movable pin 3007 of the first automatic micrometer 3008, and the second movable pin 3009 of the second micrometer 3010. The plate 3001 may be supported, based on a three-point support, relative to the L-shaped plate 3003 by the support 3006, the first movable pin 3007, and the second movable pin 3009. The plate 3001 and the L-shaped plate 3003 may be pulled with respect to each other by and fixed to each other by the first tension spring 3004 and the second tension spring 3005. The first automatic micrometer 3008 that includes the first movable pin 3007 may be so controlled by the controller 1700 as to move the first movable pin 3007. The second automatic micrometer 3010 that includes the second movable pin 3009 may be so controlled by the controller 1700 as to move the second movable pin 3009.

An angle of inclination of the plate 3001 to the L-shaped plate 3003 in a direction from the support 3006 to the first movable pin 3007 may be adjusted by a movement of the first movable pin 3007 of the first automatic micrometer 3008. An angle of inclination of the mirror holding section 3002, i.e., an angle of posture of a mirror, in a direction from the support 3006 to the first movable pin 3007 may be adjusted by the movement of the first movable pin 3007 of the first automatic micrometer 3008.

An angle of inclination of the plate 3001 to the L-shaped plate 3003 in a direction from the support 3006 to the second movable pin 3009 may be adjusted by a movement of the second movable pin 3009 of the second automatic micrometer 3010. An angle of inclination of the mirror holding section 3002, i.e., the angle of posture of the mirror, in a direction from the support 3006 to the second movable pin 3009 may be adjusted by the movement of the second movable pin 3009 of the second automatic micrometer 3010.

The angle of posture of the reflection mirror held by the mirror holding section 3002 may be controlled biaxially by controlling both the first automatic micrometer 3008 and the second automatic micrometer 3010. The angle of posture of the reflection mirror held by the mirror holding section 3002 may be controlled uniaxially by controlling one of the first automatic micrometer 3008 and the second automatic micrometer 3010. For a direction in which the control of the angle of posture of the reflection mirror held by the mirror holding section 3002 is not required, one of the first automatic micrometer 3008 and the second automatic micrometer 3010 may be replaced by a manual micrometer.

Besides the mirror holder that includes the biaxial gimbal mechanism, the actuator mirror holder may be any other mirror holder provided with a mechanism that allows for adjustment of an angle of posture of any reflection mirror.

The actuator mirror holder 3000 may be used, for example, to hold the rear mirror 1310 provided in the power oscillator 1300. For example, the actuator mirror holder 3000 may be used to change the angle of posture of the rear mirror 1310 provided in the power oscillator 1300. In an example where a uniaxial actuator mirror holder is employed, only one of the first automatic micrometer 3008 and the second automatic micrometer 3010 may be controlled by the controller 1700.

The actuator mirror holder 3000 may be used, for example, to hold the second output coupler mirror 1330 provided in the power oscillator 1300. For example, the actuator mirror holder 3000 may be used to change the angle of posture of the second output coupler mirror 1330 provided in the power oscillator 1300. In an example where the uniaxial actuator mirror holder is employed, only one of the first automatic micrometer 3008 and the second automatic micrometer 3010 may be controlled by the controller 1700.

The actuator mirror holder 3000 may be used, for example, to hold the fourth high-reflection concave mirror 1550 provided in the optical pulse stretcher 1500. For example, the actuator mirror holder 3000 may be used to change the angle of posture of the fourth high-reflection concave mirror 1550 provided in the optical pulse stretcher 1500. In an example where the uniaxial actuator mirror holder is employed, only one of the first automatic micrometer 3008 and the second automatic micrometer 3010 may be controlled by the controller 1700.

The actuator mirror holder 3000 may be used, for example, to hold the third high-reflection mirror 1410 provided in the power oscillator beam steering unit 1400. For example, the actuator mirror holder 3000 may be used to change the angle of posture of the third high-reflection mirror 1410 provided in the power oscillator beam steering unit 1400. In an example where a biaxial actuator mirror holder is employed, both the first automatic micrometer 3008 and the second automatic micrometer 3010 may be controlled by the controller 1700.

The actuator mirror holder 3000 may be used, for example, to hold the fourth high-reflection mirror 1420 provided in the power oscillator beam steering unit 1400. For example, the actuator mirror holder 3000 may be used to change the angle of posture of the fourth high-reflection mirror 1420 provided in the power oscillator beam steering unit 1400. In an example where the biaxial actuator mirror holder is employed, both the first automatic micrometer 3008 and the second automatic micrometer 3010 may be controlled by the controller 1700.

[6.2 Controller]

Figure 21:
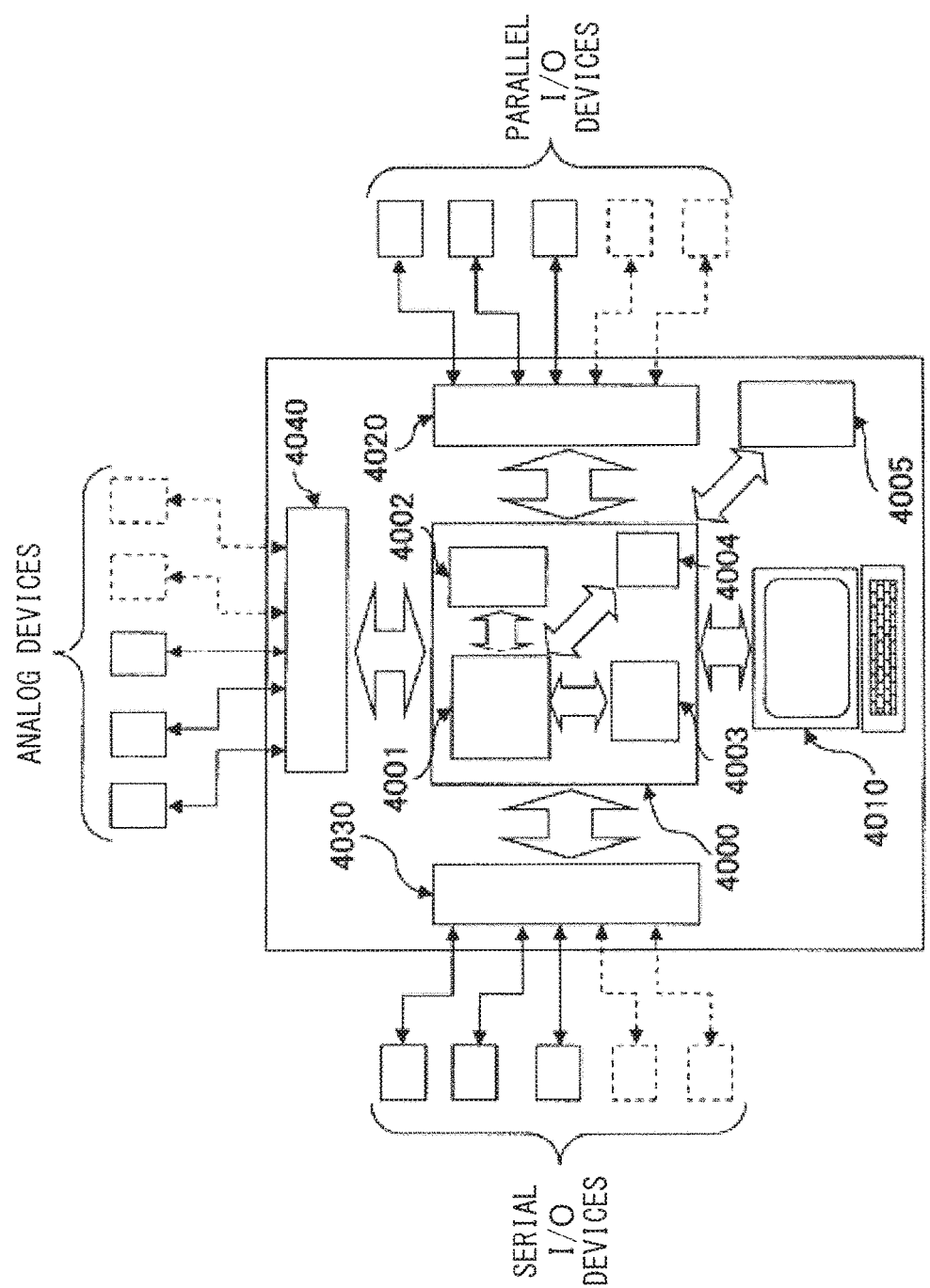
FIG. 21 illustrates an example of a controller according to any of the example embodiments of the disclosure.

FIG. 21 illustrates an example of a controller according to any of the example embodiments of the disclosure.

Each controller according to any of the example embodiments of the disclosure may be configured of a general-purpose control apparatus such as a computer and a programmable controller. For example, each controller may be configured as follows.

[Configuration]

A controller may include a processing section 4000, a storage memory 4005, a user interface 4010, a parallel input/output (I/O) controller 4020, a serial I/O controller 4030, and an analog-to-digital (A/D) and digital-to-analog (D/A) converter 4040. The storage memory 4005, the user interface 4010, the parallel 1/O1 controller 4020, the serial I/O controller 4030, and the A/D and D/A converter 4040 may be coupled to the processing section 4000. The processing section 4000 may include a central processing unit (CPU) 4001, a memory 4002, a timer 4003, and a graphics processing unit (GPU) 4004. The memory 4002, the timer 4003, and the GPU 4004 may be coupled to the CPU 4001.

[Operation]

The processing section 4000 may load programs stored in the storage memory 4005, The processing section 4000 may execute the loaded programs, may read data from the storage memory 4005 in accordance with the execution of the programs, and may write data in the storage memory 4005.

The parallel I/O controller 4020 may be coupled to devices operable to perform communication through parallel I/O ports. The parallel I/O controller 4020 may control digital-signal-based communication performed, through the parallel I/O port, in the execution of the programs by the processing section 4000.

The serial I/O controller 4030 may be coupled to devices operable to perform communication through serial I/O ports. The serial I/O controller 4030 may control digital-signal-based communication performed, through the serial I/O ports, in the execution of the programs by the processing section 4000.

The A/D and D/A converter 4040 may be coupled to devices operable to perform communication through analog ports. The A/D and D/A converter 4040 may control analog-signal-based communication performed, through the analog ports, in the execution of the programs by the processing section 4000.

The user interface 4010 may provide an operator with display that shows a progress of the execution of the programs performed by the processing section 4000 and allow the operator to instruct the processing section 4000 to stop execution of the programs or to execute an interruption routine.

The CPU 4001 of the processing section 4000 may execute arithmetic processing of the programs. The memory 4002 may temporarily hold the programs or may temporarily hold data in the arithmetic process in the execution process of the programs performed by the CPU 4001. The timer 4003 may measure time and elapsed time, and may output the time and the elapsed time to the CPU 4001 in accordance with the execution of the programs. The GPU 4004 may, when the processing section 4000 has received image data, process the image data in accordance with the execution of the programs, and may output a result of the processing to the CPU 4001.

The devices that are coupled to the parallel I/O controller 4020 and are operable to perform communication through the parallel I/O ports may include any other controller.

The devices that are coupled to the serial I/O controller 4030 and are operable to perform communication through the serial I/O ports may include a DC high-voltage power supply.

The devices that are coupled to the A/D and D/A converter 4040 and are operable to perform communication through the analog ports may include any sensor such as the first image sensor and the second image sensor.

The foregoing description is intended to be merely illustrative rather than limiting. It should therefore be appreciated that variations may be made in example embodiments of the disclosure by persons skilled in the art without departing from the scope as defined by the appended claims.

Furthermore, the technology encompasses any possible combination of some or all of the various embodiments described herein and incorporated herein.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser apparatus, comprising:
   a first laser resonator configured to generate a laser beam;
   a first optical element configured to adjust a divergence in a first direction of the laser beam;
   a second optical element configured to adjust a divergence in a second direction of the laser beam, the second direction being perpendicular to the first direction;
   a measuring unit configured to measure the divergence in the first direction and the divergence in the second direction of the laser beam; and
   a controller configured to control both of the first optical element and the second optical element, based on the divergence in the first direction and the divergence in the second direction of the laser beam both measured by the measuring unit.

2. A laser apparatus, comprising:
   a first laser resonator configured to generate a laser beam;
   a first optical element configured to adjust a divergence in a first direction of the laser beam;
   a second optical element configured to adjust a divergence in a second direction of the laser beam, the second direction being perpendicular to the first direction;
   a third optical element configured to adjust a pointing of the laser beam;
   a measuring unit configured to measure the divergence in the first direction of the laser beam, the divergence in the second direction of the laser beam, and the pointing of the laser beam; and a controller configured to control one or both of the first optical element and the second optical element, based on the divergence in the first direction and the divergence in the second direction of the laser beam, both measured by the measuring unit, and to control the third optical element, based on the pointing of the laser beam measured by the measuring unit.

3. The laser apparatus according to claim 2, wherein the measuring unit includes a light condensing optical system.

4. The laser apparatus according to claim 2, wherein
the third optical element includes a biaxially-controllable actuator, and
the controller biaxially controls the third optical element.

5. The laser apparatus according to claim 2, further comprising a second laser resonator, wherein
the second laser resonator comprises a power oscillator,
the first laser resonator comprises a master oscillator, and
the first optical element and the second optical element are provided in an optical path between the first laser resonator and the second laser resonator.

6. A laser apparatus, comprising:
a first laser resonator configured to generate a laser beam;
a first optical element configured to adjust a divergence in a first direction of the laser beam;
a second optical element configured to adjust a divergence in a second direction of the laser beam, the second direction being perpendicular to the first direction;
a fourth optical element configured to adjust a position of the laser beam;
a measuring unit configured to measure the divergence in the first direction of the laser beam, the divergence in the second direction of the laser beam, and the position of the laser beam; and
a controller configured to control one or both of the first optical element and the second optical element, based on the divergence in the first direction and the divergence in the second direction of the laser beam, both measured by the measuring unit, and to control the fourth optical element, based on the position of the laser beam measured by the measuring unit.

7. The laser apparatus according to claim 6, wherein the measuring unit includes a transfer optical system.

8. The laser apparatus according to claim 6, wherein
the fourth optical element includes a biaxially-controllable actuator, and
the controller biaxially controls the fourth optical element.

9. A laser apparatus, comprising:
a first laser resonator configured to generate a laser beam;
a first optical element configured to adjust a divergence in a first direction of the laser beam;
a second optical element configured to adjust a divergence in a second direction of the laser beam, the second direction being perpendicular to the first direction;
a measuring unit configured to measure the divergence in the first direction and the divergence in the second direction of the laser beam;
a controller configured to control one or both of the first optical element and the second optical element, based on the divergence in the first direction and the divergence in the second direction of the laser beam, both measured by the measuring unit;
a second laser resonator including the first optical element, and configured to amplify an output of the laser beam; and an optical pulse stretcher including the second optical element, and configured to stretch a pulse of the laser beam.

10. A laser apparatus, comprising:
a first laser resonator configured to generate a laser beam;
a first optical element configured to adjust a divergence in a first direction of the laser beam;
a second optical element configured to adjust a divergence in a second direction of the laser beam, the second direction being perpendicular to the first direction;
a measuring unit configured to measure the divergence in the first direction and the divergence in the second direction of the laser beam;
a controller configured to control one or both of the first optical element and the second optical element, based on the divergence in the first direction and the divergence in the second direction of the laser beam, both measured by the measuring unit;
a first optical pulse stretcher including the first optical element, and configured to stretch a pulse of the laser beam; and
a second optical pulse stretcher including the second optical element, and configured to stretch the pulse of the laser beam.

11. The laser apparatus according to claim 10, wherein
the first optical element comprises a first concave mirror, and
the second optical element comprises a second concave mirror.

12. The laser apparatus according to claim 10, wherein the measuring unit includes a light condensing optical system.

13. The laser apparatus according to claim 10, wherein the measuring unit includes a transfer optical system.

14. The laser apparatus according to claim 10, further comprising:
a third optical element that includes a first biaxially-controllable actuator, and
a fourth optical element that includes a second biaxially-controllable actuator,
wherein the controller biaxially controls the third optical element and the fourth optical element.

15. The laser apparatus according to claim 10, wherein:
the first optical pulse stretcher includes a first beam splitter, and
the first optical element is provided downstream of the first beam splitter on a route of the laser beam.

16. The laser apparatus according to claim 15, wherein the first optical pulse stretcher further includes a fifth optical element, the fifth optical element being provided in an optical path between the first beam splitter and the first optical element, and being configured to guide the laser beam to the first optical element.

17. The laser apparatus according to claim 16, wherein a focal distance of the first optical element and a focal distance of the fifth optical element are substantially the same.

18. The laser apparatus according to claim 10, wherein
the second optical pulse stretcher includes a second beam splitter, and
the second optical element is provided downstream of the second beam splitter on a route of the laser beam.

19. The laser apparatus according to claim 18, wherein the second optical pulse stretcher further includes a sixth optical element, the sixth optical element being provided in an optical path between the second beam splitter and the second optical element, and being configured to guide the laser beam to the second optical element.

20. The laser apparatus according to claim 19, wherein a focal distance of the second optical element and a focal distance of the sixth optical element are substantially the same.

* * * * *